US011900132B2

(12) United States Patent
Kiriakou et al.

(10) Patent No.: US 11,900,132 B2
(45) Date of Patent: Feb. 13, 2024

(54) DYNAMIC MODIFICATION OF DISPLAYED INTERFACE ELEMENTS BASED ON CONTEXTUAL DATA

(71) Applicant: The Toronto-Dominion Bank, Toronto (CA)

(72) Inventors: Alexander Kiriakou, Toronto (CA); Milos Dunjic, Oakville (CA); Arthur Carroll Chow, Markham (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 810 days.

(21) Appl. No.: 15/622,647

(22) Filed: Jun. 14, 2017

(65) Prior Publication Data

US 2018/0365024 A1 Dec. 20, 2018

(51) Int. Cl.
*G06F 15/16* (2006.01)
*G06F 9/451* (2018.01)
(Continued)

(52) U.S. Cl.
CPC .......... *G06F 9/451* (2018.02); *G06F 3/04847* (2013.01); *G06Q 20/102* (2013.01);
(Continued)

(58) Field of Classification Search
CPC ..... G06F 9/451; G06F 3/0482; G06Q 20/102; G06Q 20/20
(Continued)

(56) References Cited

U.S. PATENT DOCUMENTS

2004/0107268 A1* 6/2004 Iriya ..................... G06F 3/0482
719/329
2011/0282508 A1* 11/2011 Goutard ................... H02J 3/06
700/286

(Continued)

OTHER PUBLICATIONS

"Home Screen Quick Actions," retrieved from https://developer.apple.com/ios/human-interface-guidelines/extensions/home-screen-actions/ on Jun. 13, 2017 (3 pages).

(Continued)

*Primary Examiner* — Suraj M Joshi
*Assistant Examiner* — Joel Mesa
(74) *Attorney, Agent, or Firm* — Duane Morris LLP

(57) ABSTRACT

The disclosed embodiments include computer-implemented systems and processes that dynamically and selectively modify portions of a displayed interface to include interface elements that, when selected by a user through a single provided input, initiate a performance of a data exchange in accordance with parameter values consistent with prior initiated data exchanges. For example, a communications device may display, on a display unit, a first interface element representative of a first data exchange and may receive expected values of parameters that characterize the second data exchange. When a determined parameter value is consistent with the expected parameter values, the communications device may modify the first interface element and present, on the display unit, the modified first interface element and a second interface element within the interface. Upon selection of the second interface element, the communications device may initiate the second data exchange in accordance with the expected parameter values.

20 Claims, 11 Drawing Sheets

(51) Int. Cl.
  *G06F 3/04847* (2022.01)
  *G07G 1/01* (2006.01)
  *G06Q 20/10* (2012.01)
  *G06Q 20/20* (2012.01)
  *G06F 3/0482* (2013.01)

(52) U.S. Cl.
  CPC .............. *G06Q 20/20* (2013.01); *G07G 1/01* (2013.01); *G06F 3/0482* (2013.01)

(58) Field of Classification Search
  USPC ........................................................ 709/223
  See application file for complete search history.

(56) References Cited

U.S. PATENT DOCUMENTS

| | | | | |
|---|---|---|---|---|
| 2014/0359465 A1* | 12/2014 | Litan Sever | ........ | G06F 3/04817 715/738 |
| 2015/0193749 A1* | 7/2015 | Ivanoff | .................. | G06Q 10/10 705/40 |

OTHER PUBLICATIONS

"Widgets," retrieved from https://developer.apple.com/ios/human-interface-guidelines/extensions/widgets/ on Jun. 13, 2017 (4 pages).

\* cited by examiner

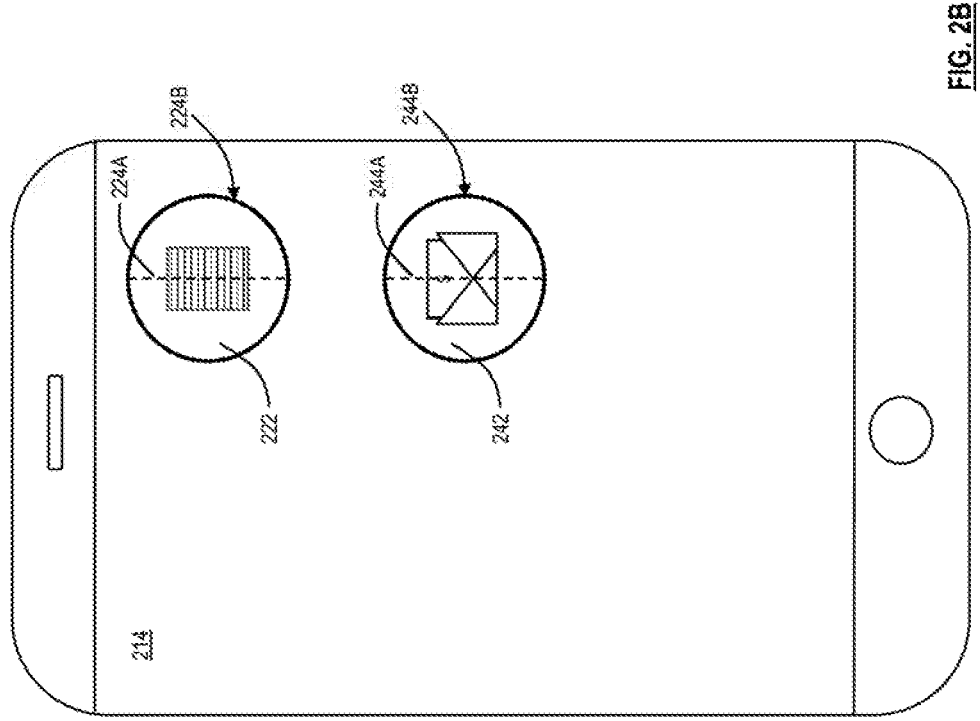

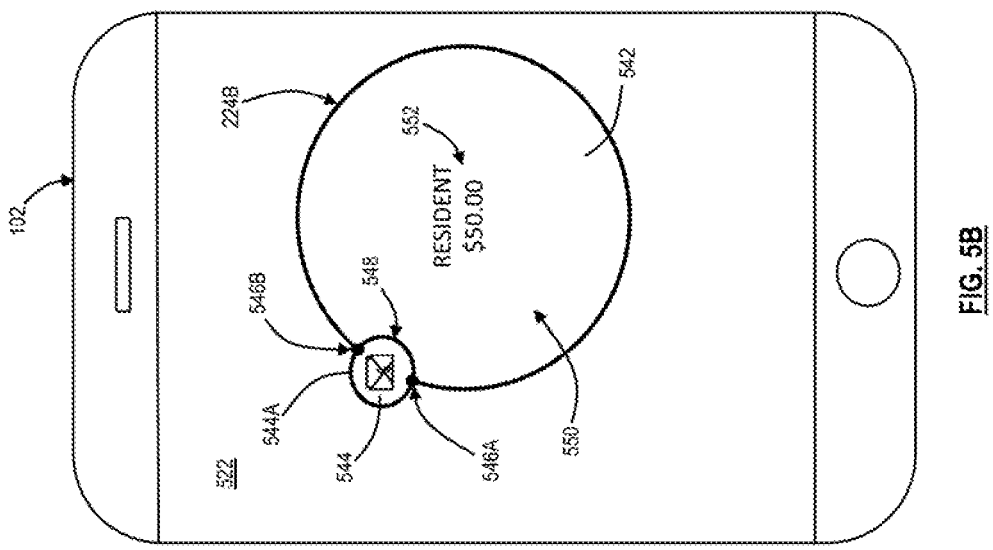

DYNAMIC MODIFICATION OF DISPLAYED INTERFACE ELEMENTS BASED ON CONTEXTUAL DATA

TECHNICAL FIELD

The disclosed embodiments generally relate to computer-implemented systems and processes that dynamically and selectively modify displayed interface elements based on contextual data characterizing prior exchanges of data between network-connected devices.

BACKGROUND

Today, payment systems and related technologies continuously evolve in response to advances in payment instruments, such as the ongoing transition from physical transaction cards to digital payment instruments is maintained on mobile devices. These innovations result in additional mechanisms for submitting payment to an electronic or physical merchant and for flexibly funding transactions initiated by the electronic or physical merchant, and extend beyond the capabilities of card-based payment systems that administer and interact with point-of-sale (POS) devices disposed at merchant locations.

Today, mobile applications and graphical user interfaces (GUIs) continue to evolve in complexity, especially as customers of financial institutions transition to mobile banking. These innovations result in additional mechanisms for accessing, viewing, and manipulating customer data and services provided by the financial institutions on mobile communications devices that incorporate display units characterized by decreasing sizes and increasing functionalities.

SUMMARY

The disclosed embodiments include exemplary computer-implemented systems, devices, and processes that dynamically and selectively modify portions of a presented graphical user interface to include interface elements that, when selected by a user through a single provided input, trigger an initiation of an expected data exchange in accordance with parameter values consistent with prior initiated data exchanges.

For example, in some embodiments, a communications device includes a display unit, an input unit, a communications unit, a storage unit storing instructions, and at least one processor coupled to the display unit, the input unit, the communications unit, and the storage unit. The at least one processor is configured to execute the instructions to load, from the storage unit, a first interface element representative of a first data exchange involving the communications device, and display, on the display unit, an interface that includes the first interface element. The first interface element can include a boundary that encloses a corresponding portion of the interface. The at least one processor is further configured to execute the instructions to receive, via the communications unit from a computer system, data indicative of an expected occurrence of a second data exchange involving the communications device. The data can include expected values of parameters that characterize the second data exchange. The at least one processor is further configured to execute the instructions to generate a second interface element representative of the second data exchange. Additionally, the at least one processor is configured to execute the instructions to determine a value of a parameter, to compare the determined parameter value with the expected parameter values, and when the determined parameter value is consistent with the expected parameter values, modify the first interface element and present, on the display unit, the modified first interface element and the second interface element within the portion of the interface enclosed by the boundary. The at least processor is further configured to execute the instructions to receive input data from the input unit indicative of a selection of the second interface element, and in response to the received input data, perform operations that initiate the second data exchange in accordance with the expected parameter values.

In further embodiments, a computer-implemented method includes loading, by at least one processor, and from a storage unit, a first interface element representative of a first data exchange involving a device, and displaying, by the at least one processor, and on a display unit, an interface that includes the first interface element. The first interface element can include a boundary that encloses a corresponding portion of the interface. The computer-implemented method also includes receiving, by the at least one processor, and via a communications unit from a computer system, data indicative of an expected occurrence of a second data exchange involving the device. The data can include expected values of parameters that characterize the second data exchange. Further, the computer-implemented method includes generating, by the at least one processor, a second interface element representative of the second data exchange, and determining, by the at least one processor, a value of a parameter. The computer-implemented method also includes, by the at least one processor, comparing the determined parameter value with the expected parameter values and when the determined parameter value is consistent with the expected parameter values, modifying the first interface element and presenting, on the display unit, the modified first interface element and the second interface element within the portion of the interface enclosed by the boundary. Additionally, the computer-implemented method includes receiving, by the at least one processor, input data from the input unit indicative of a selection of the second interface element, and in response to the received input data, performing, by the at least one processor, operations that initiate the second data exchange in accordance with the expected parameter values.

Further, in some embodiments, a tangible, non-transitory computer-readable medium storing instructions that, when executed by at least one processor, perform a method that includes loading, from a storage unit, a first interface element representative of a first data exchange involving a device, and displaying, on a display unit, an interface that includes the first interface element. The first interface element can include a boundary that encloses a corresponding portion of the interface. The method also includes receiving, via a communications unit from a computer system, data indicative of an expected occurrence of a second data exchange involving the device. The data can include expected values of parameters that characterize the second data exchange. The method further includes generating a second interface element representative of the second data exchange and determining a value of a parameter. Additionally, the method includes comparing the determined parameter value with the expected parameter values and when the determined parameter value is consistent with the expected parameter values, modifying the first interface element and presenting, on the display unit, the modified first interface element and the second interface element within the portion of the interface enclosed by the boundary. The method also includes receiving input data from the input unit indicative of a selection of the second interface element, and in response to the received input data, performing operations that initiate the second data exchange in accordance with the expected parameter values.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIG. 2B is a diagram of an exemplary graphical user interface, consistent with the disclosed embodiments.

FIG. 5B is an additional diagram of an exemplary graphical user interface, consistent with the disclosed embodiments.

DETAILED DESCRIPTION

Figure 1:
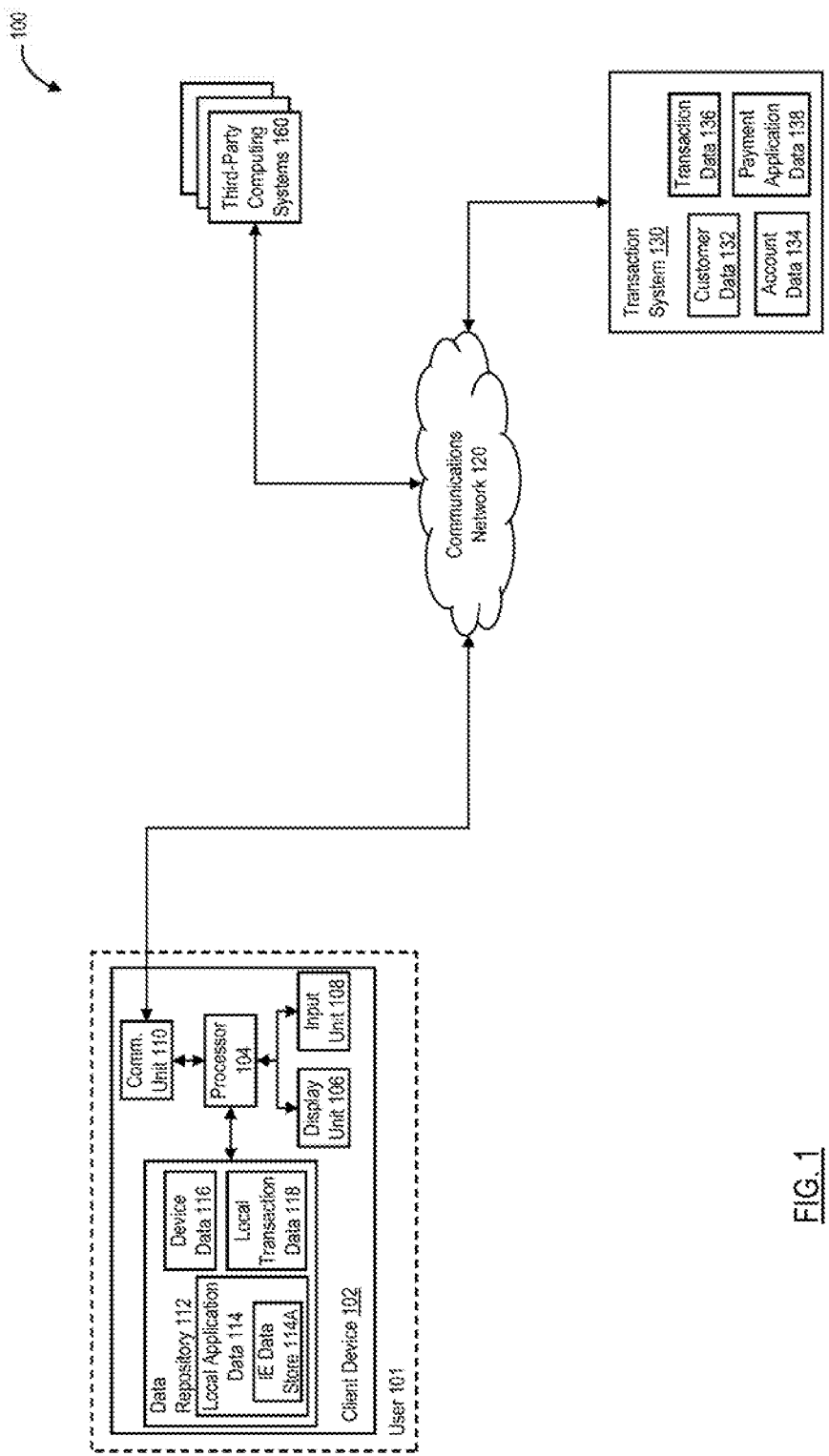
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings use d herein are for organizational purposes only, and are not to be construed as limiting the described subject matter.

This specification describes exemplary computer-implemented systems, devices, and processes that, among other things, dynamically and selectively modify portions of a displayed interface to include interface elements that, when selected by a user through a single provided input, trigger an initiation of an expected data exchange in accordance with parameter values consistent with prior initiated data exchanges.

In certain aspects, and as described below, a communications device may load, from a storage unit, data corresponding to a first interface element representative of a first data exchange involving the communications device, and may display, on a display unit, an interface that includes the first interface element. The communications device may also receive, via a communications module from a computer system, data indicative of an expected occurrence of a second data exchange involving the communications device. The received data may, in some instances, include expected values of parameters that characterize the second data exchange, such as, but not limited to, a time or date on which the second data exchange is expected to occur, a range of times or dates during which the second data exchange is expected to occur, or an expected geographic position or region associated with the second data exchange. In response to the received data, the communications device may be configured to generate a second interface element representative of the second data exchange.

Further, in some aspects, the communications device may determine a value of a parameter, and may perform operations that compare the determined parameter value with the expected parameter values. When the determined parameter value is consistent with the expected parameter values, the communications device may perform operations that modify the first interface element and present, on the display unit, the modified first interface element and the second interface element within the portion of the interface enclosed by the boundary. The communications device may also receive input data from the input unit indicative of a selection of the second interface element, and in response to the received input data, perform operations that initiate the second data exchange in accordance with the expected parameter values.

By way of example, the determined parameter value may correspond to a current date or time, and the communications device may establish a consistency between the determined parameter value and the expected parameter values when the current date or time falls within the expected range of dates or times or alternatively, within a threshold time period of the expected date or time. In other instances, and as described below, the determined parameter value may correspond to a current geographic position of the communications device (e.g., as determined by an integrated positional sensor or in response to a detection of a wireless signal broadcast by a beacon device of a proximity system), and the communications device may establish the consistency when the current geographic position is disposed within a threshold distance of the expected geographic position or alternatively, is disposed within the expected geographic region. The disclosed embodiments are, however, not limited these examples of determined and expected parameter values, and as outlined below, the communications device may determine a consistency between any additional or alternate determined (or received) and expected parameter values that would be appropriate to the communications device, the computing system, and the first and second data exchanges.

In certain aspects, and as outlined below, each of the first and second data exchanges corresponds to a payment transaction, e.g., a bill-payment transaction, that funds a balance of an outstanding invoice. For example, the user of the communications device may obtain wireless service from a communications utility (e.g., Rogers™ Communications), which may invoice the user on a regular basis for an amount of wireless spectrum consumed during a prior monitoring period (e.g., a monthly invoice for the wireless spectrum consumed during a prior monthly monitoring period). In some instances, and consistent with the disclosed embodiments, the first and/or second data exchanges may initiate a bill-payment transaction that transfers funds consistent with a transaction amount (e.g., the outstanding invoiced balance) from a source account of the user (e.g., the user's checking account, credit card account, etc.) to a target account designated to receive payments by a payee of the outstanding invoice (e.g., Rogers™ Communications).

In other instances, an individual or business entity may provide goods or services to the user of the communications device in exchange for specified payments provided by the user at agreed-upon intervals, e.g., via a peer-to-peer (P2P) transaction initiated by the communications device and involving an additional device operated by the individual or business entity. For example, the user may reside in an apartment building, and may engage a resident of that apartment building to care for a pet during each workday in exchange for regular payments of agreed-upon amount of funds. In certain aspects, and consistent with the disclosed embodiments, the first and or second data exchanges may facilitate a P2P transaction that electronically transfers funds consistent with the agreed-upon amount from the source account of the user to a target account designated by the resident to receive funds from P2P transactions.

To initiate these and other examples of payment transactions, the communications device may locally store and execute an application program, such as a mobile payment application provided by a financial institution. By way of example, the first interface element displayed by the communications device may correspond to an icon that identifies and visually represents the mobile payment application and/or the financial institution. Upon receipt of user input that selects the first interface element (e.g., user input that selects a portion of the displayed interface enclosed by the boundary of the first interface element), the executed mobile payment application may cause the communications device to generate, and display within the interface, additional interface elements that prompt the user to provide input specifying values of certain transaction parameters (e.g., values of transaction parameters, such as a transaction amount, a desired transaction date or time, identifiers of source and target accounts, etc.) and additional input that confirms the requested initiation of the payment transaction in accordance with the specified parameter values.

In one instance, the communications device may include a display unit capable of displaying the additional interface elements within a single interface (e.g., a single screen or window), and the user may provide input to the communications device that specifies the transfer parameters and requests the initiation of the electronic funds transfer without navigating away from that single interface. In other instances, the communications device may be incapable of the presenting the additional interface elements within the single screen or window. For example, the communications device may include a smart phone having a pressure-sensitive, touchscreen display unit, and the dimensions of the display unit may require a disposition of the additional interface elements across multiple, successively displayed screens or windows, each of which may prompt the user to provide input specifying a portion of the transaction parameter values and/or input confirming the requested initiation of the payment transaction, along with additional input that causes the communications device to display successive ones of the multiple screens or windows.

In other instances, the user may operate the communications device using a single hand, and may provide input to the communications device (e.g., to the pressure-sensitive touchscreen display unit) using a single digit, such as a finger or thumb. The single-handed operation of the communications device, and the provision of input using the single digit, may limit the user's ability to navigate reliably and accurately through the successively displayed screens or windows. Additionally, the limited dimensions of the display unit, and thus, the limited dimensions of the displayed screens or windows, may reduce an accuracy of the input data provided by the user, increase an incidence of errors within the specified transactions parameter values, and require the provision of additional input data to correct the erroneous transaction parameter values, all of which collectively reduce a speed at which the executed mobile payment application initiates an exchange of data in accordance with the user-specified transfer parameters.

Further, in additional instances, the limited dimensions of the display unit also limit a number of icons and other interface elements displayable within a single screen or window. For example, the limited size of display units incorporated within many mobile communications devices, such as smart phones or smart watches, may strictly limit the concurrent presentation of icons that facilitate the initiation of certain transactions (e.g., the bill-payment transactions and the P2P transactions described above) and additional interface elements providing contextual information that guides the user during the initiation of the transactions and the provision of input specifying values of corresponding transaction parameters.

Certain of the disclosed embodiments, which associate a single displayed interface element with expected values of parameters that characterize an exchange of data and, in response to a single user input that selects that single displayed interface element, initiate the data exchange in accordance with the expected parameter values, may be implemented in addition to or as an alternate to conventional processes, which initiate a data exchange in accordance with parameter values specified in response to multiple interface elements disposed across successively displayed screens or windows. Further, certain of the disclosed embodiments, which dispose multiple, functional interface elements within a portion of a displayed interface bounded by a previously displayed interface element, may be implemented in addition to or an alternate to many conventional processes, which position and display each of these functional interface elements at corresponding and distinct positions within the displayed interface.

By eliminating the need to navigate through successively displayed screens or windows, and by replacing a single interface element displayed within an interface by multiple and functional interface elements, certain of the disclosed embodiments may be implemented by mobile computing devices having limited-size display units (e.g., smart phones, smart watches, etc.) or limited-functionality display units (e.g., wearable computing devices and other form factors, etc.), and can improve an ability of these mobile computing devices to display information and interact with users.

I. Exemplary Computing Environments

FIG. 1 is a diagram illustrating an exemplary computing environment 100, consistent with certain disclosed embodiments. As illustrated in FIG. 1, environment 100 may include a client device 102, a transaction system 130, and one or more third-party computing systems 160, each of which may be interconnected through any appropriate combination of communications networks, such as network 120.

Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In an embodiment, client device 102 may include a computing device having one or more tangible, non-transitory memories that store data and/or software instructions, and one or more processors, e.g., processor 104, configured to execute the software instructions. The one or more tangible, non-transitory memories may, in some aspects, store software applications, application modules, and other elements of code executable by the one or more processors, such as a web browser or an application associated with transaction system 130 (e.g., a mobile payment application). By way of example, the mobile payment application, when executed by processor 104, may cause client device 102 dynamically and selectively modify portions of a displayed interface to include interface elements that, when selected by a user through a single provided input, initiate a performance of a data exchange in accordance with parameter values consistent with prior initiated data exchanges, as described below.

Further, as illustrated in FIG. 1, client device 102 may also include a display unit 106 configured to present interface elements to user 101, and an input unit 108 configured to receive input from user 101, e.g., in response to the interface elements presented through display unit 106. By way of example, display unit 106 may include, but is not limited to, an LCD display unit or other appropriate type of display unit, and input unit 108 may include, but input not limited to, a keypad, keyboard, touchscreen, voice activated control technologies, or appropriate type of input device. Further, in additional aspects (not depicted in FIG. 1), the functionalities of display unit 106 and input unit 108 may be combined into a single device, e.g., a pressure-sensitive touchscreen display unit that presents interface elements and receives input from user 101. Client device 102 may also include a communications unit 110, such as a wireless transceiver device, coupled to processor 104 and configured by processor 104 to establish and maintain communications with network 120 using any of the communications protocols described herein.

Client device 102 may also establish and maintain, within the one or more tangible, non-tangible memories, one or more structured or unstructured data repositories or databases, e.g., data repository 112, that include local application data 114, device data 116, and local transaction data 118. In one instance, local application data 114 may include data that supports and facilitates an execution of the stored software applications, application modules, and other code elements by processor 104. For example, and as described above, client device 102 may store a mobile payment application within local application data 114 that, when executed by processor 104, causes client device 102 to perform operations that initiate one or more payment transactions, such as a bill-payment transaction funding an outstanding invoice or a peer-to-peer (P2P) transaction.

In certain instances, and as illustrated in FIG. 1, local application data 114 may include an interface element (IE) data store 114A characterizing one or more interface elements associated with the mobile payment application and additionally or alternatively, one or more functions of the mobile payment application. For example, and as described below, client device 102 may obtain the mobile payment application and portions of IE data store 114A from transaction system 130 (e.g., in response to a request transmitted through communications unit 110 across network 120), and upon execution of the mobile payment application by processor 104, client device 102 may access IE data store 114A, obtain data characterizing an interface element representative of the mobile payment application or a corresponding functionality (e.g., the bill-payment or P2P-transaction functionality), and render the interface element for presentation to the user within a corresponding graphical user interface (GUI), as described below.

Referring back to FIG. 1, device data 116 may include data that uniquely identifies client device 102, such as a media access control (MAC) address of client device 102 or an IP address assigned to client device 102, and local transaction data 118 may include data specifying and characterizing one or more transactions initiated locally at client device 102 (e.g., through the executed mobile payment application) and involving user 101. For example, as described above, the initiated transactions may include bill-payment transactions initiated to fund one or more outstanding bills or invoices, and additionally or alternatively, peer-to-peer (P2P) transactions involving one or more third parties or entities. In some aspects, local transaction data 118 may specify, for each initiated transaction, data that includes, but is not limited to, a time or date of the initiated transaction, a geographic position of client device 102 at the initiation of the transaction, a transaction amount, a source and target account, and any additional or alternate information that characterizes the initiated transaction and is appropriate to the executed mobile payment application, such a unique identifier (e.g., an alpha-numeric character string) assigned to the initiated transaction by client device 102.

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

Referring back to FIG. 1, transaction system 130 and third-party computing systems 160 may each represent a computing system that includes one or more servers and tangible, non-transitory memory devices storing executable code and application modules. The servers may, for example, each include one or more processor-based computing devices, which may be configured to execute portions of the stored code or application modules to perform operations consistent with the disclosed embodiments. In some instances, and consistent with the disclosed embodiments, one or more of transaction system 130 and third-party computing systems 160 may correspond to a distributed system that includes computing components distributed across one or more networks, such as network 120, or other networks, such as those provided or maintained by cloud-service providers.

In some aspects, transaction system 130 may perform operations that provide executable application programs and supporting data to one or more client devices operating within environment 100, such as client device 102. For example, and as described above, the executable application programs may include, but are not limited to, a mobile payment application that, when executed by processor 104 of client device 102, causes client device 102 to perform operations that initiate one or more data exchanges based on specified values of data-exchange parameters (e.g., transactions, such as bill-payment transactions funding outstanding bills or invoices, or P2P transactions initiated by client device 102 and involving another individual or entity). In certain aspects, and consistent with the disclosed embodiments, transaction system 130 may be associated with, and operated by, a financial institution that issues one or more financial services accounts held by user 101, which may represent source accounts for the transactions initiated by client device 102.

In further aspects, transaction system 130 may also perform operations that retrieve from a server, collect, and maintain data characterizing prior data exchanges initiated by client device 102 (e.g., payment transactions initiated through the executed mobile payment application), that process the collected data to identify an expected occurrence of a data exchange involving client device 102 (e.g., an "expected" payment transaction), and further, that transmit expected values of parameters that characterize the expected data exchange to client device 102 across network 120. Client device 102 may perform any of the exemplary processes described below to dynamically and selectively modify portions of a displayed interface to include interface elements that, when selected by a user through a single provided input, initiate the expected data exchange (e.g., the expected payment transaction) in accordance with the expected parameter values.

Referring to FIG. 1, transaction system 130 may maintain, within the one or more tangible, non-transitory memories, customer data 132 that uniquely identifies one or more customers of the financial institution associated with transaction system 130 (e.g., user 101 that operates client device 102), and account data 134 that uniquely identifies one or more financial services accounts issued by the financial institution and held by the customers. Further, as illustrated in FIG. 1, transaction system 130 may also maintain, within the one or more tangible, non-transitory memories, transaction data 136 that identifies and characterizes one or more prior initiated payment transactions that involve these financial services accounts and corresponding ones of the customers, and further, that identifies and characterizes one or more outstanding invoices associated with the customers (e.g., as submitted by or on behalf of customers participating in bill-payment services provided by the financial institution).

For example, transaction system 130 may generate and assign to each customer a unique customer identifier (e.g., a unique, alpha-numeric character string), which transaction system may store in customer data 132 and associate with corresponding personal information (e.g., a full name, home address, date of birth, email addresses, etc.) and corresponding authentication credentials (e.g., a login, a user-specified password, a system-generated password, a personal identification number (e.g., a PIN), and data that facilitates a multi-factor authentication process, such as biometric or other appropriate data). In certain instances, transaction system 130 may also store device information identifying one or more communications devices operated by each customer (e.g., corresponding mobile telephone numbers, IP addresses, or MAC addresses) within customer data 132, and link the stored device information with corresponding and appropriate ones of the customer identifiers, as described above.

Further, and in some examples, account data 134 may include account information that identifies financial services accounts held by customers of the financial institution associated with transaction system 130 (e.g., account numbers, expiration date information, and/or card security code (CSC) data) and values of corresponding account parameters that characterize each of the identified financial services accounts (e.g., account balances or account limits). For instance, financial services accounts consistent with the disclosed embodiments may include, but are not limited to, checking accounts, savings accounts, credit card accounts, debit card accounts, demand deposit accounts, lines of credit, and other accounts available for use in transactions involving the customers, such as transactions initiated by the mobile payment application executed by client device 102. Further, in certain instances, transaction system 130 may perform operations that associate, within account data 134, the account information and account parameter values with corresponding ones of the customer identifiers stored within customer data 132 (e.g., the customer identifier, customer email address, device identifiers, etc.).

Transaction data 136 may include information that identifies and characterizes one or more prior transactions initiated by corresponding customers of the financial institution (e.g., as identified within customer data 132) and involving corresponding financial services accounts held by these customers (e.g., as identified within account data 134). In some instances, the information identifying and characterizing each of the prior transactions may include, but is not limited to, a transaction amount, a payor identifier (e.g., a corresponding customer identifier stored within customer data 132), a payee identifier (e.g., a name, a device identifier, etc.), identifiers of a source account of the payor and a target account of the payee (e.g., account identifiers stored within account data 144), dates and/or locations of the initiated transactions (e.g., a geographic position of a communications device that initiated a P2P transaction), and data characterizing a type of payment and/or the payee.

For example, the prior transactions may include payments of invoices regularly issued to the customers of the financial institution by various wireless service providers (e.g., Rogers™ Communications, etc.), utilities (e.g., Toronto Hydro™), and other entities, which may be initiated by transaction system 130 and/or communications devices operated by customers of the financial institution using any of the exemplary payment-transaction processes described herein. In other instances, the prior transactions may include peer-to-peer (P2P) transactions initiated by devices operated by customers of the financial institution (e.g., by client device 102 in response to input provided by user 101) and involving transfers of funds from specifies source accounts to corresponding target accounts of third parties or entities. The disclosed embodiments are, however, not limited these examples of prior initiated transactions, and in further aspects, transaction data 136 may identify and characterize any additional or alternate transaction involving the customers of the financial institution or the accounts held by the customers, and capable of being monitored by transaction system 130.

In further aspects, transaction data 136 may also include information that identifies and characterizes one or more outstanding invoices issued to the customers of the financial institution by the various wireless service providers, utilities, and other entities, such as those described above. By the way of example, the information identifying and characterizing each of the outstanding invoices may include, but is not limited to, an identifier of the customer of the financial institution associated with the outstanding invoice (e.g., a corresponding customer identifier, as stored in customer data 132), an identifier of the payee (e.g., a name of the wireless service provider, utility, etc.), an identifier of a corresponding payee account (e.g., an account number, routing number, etc.), a payment due date, and other data characterizing a payment type or the payee.

In certain instances, a customer of the financial institution, e.g., user 101, may input portions of the information that identifies and characterizes an outstanding invoice to client device 102, which may package the input into invoice information and transmit the packaged invoice information across network 120 to transaction system 130. In other instances, and consistent with the disclosed embodiments, transaction system 130 may receive information identifying and characterizing an outstanding invoice directly from a computing system associated with the wireless service provider, utility, or other entity that issued the outstanding invoice, e.g., from one of third-party computing systems 160 across network 120. Transaction system 130 may, upon receipt of the portions of the invoice information from the customer device (e.g., client device 102 operated by user 101) and/or third-party computing systems 160, associate the received invoice information with a corresponding customer identifier and store the associated invoice information and the customer identifier within portions of transaction data 136. In some instance, the customers can access portions of the stored invoice information through a corresponding digital portal associated with transaction system 130, such as a graphical user interface generated by a mobile payment application executed by client device 102 or a web page presented by client device 102 upon execution of a web browser.

In additional aspects, transaction system 130 may also maintain, within the one or more tangible, non-transitory memories, payment application data 138 that includes one or more executable payment applications and additional data that supports and facilitates an execution of the payment applications by corresponding communications devices operating within environment 100, such as client device 102. For example, payment application data 138 may include the executable mobile payment application provided to client device 102 by transaction system 130, along with supporting data that characterizes one or more interface elements associated with the mobile payment application and additionally or alternatively, one or more functions of the mobile payment application, portions of which may be provided to client device 102 by transaction system 130.

Referring back to FIG. 1, third-party computing systems 160 may include one or more computing systems maintained by wireless service providers, local utilities, and other business entities that generate and provide regular invoices to customers of the financial institution and additionally or alternatively, that perform operations to transmit information characterizing the generated invoices across network 120 to devices operated by corresponding ones of the customers (e.g., client device 102 operated by user 101) or to transaction system 130, as described above. Third-party computing systems 160 may also include one or more additional computing systems that perform operations to clear and settle transactions initiated by devices operated by customers of the financial institution associated with transaction system 130, such as bill-payment transactions and P2P transactions, as described below. The disclosed embodiments are not limited to these examples of computing systems, and in further aspects, third-party computing systems 160 may include a computing system maintained by any additional or alternate entity and configured to perform any additional or alternate operation appropriate to client device 102, transaction system 130, and other devices operating within environment 100.

II. Exemplary Computer-Implemented Processes for Dynamically Modifying Displayed Interfaces Based on Prior Data Exchanges In some embodiments, a network-connected client device, e.g., client device 102 operated by user 101, may perform operations that dynamically and selectively modify portions of a displayed interface to include one or more interface elements that, when selected by user 101, cause client device 102 to initiate a performance of a data exchange in accordance with parameter values consistent with prior initiated data exchanges involving client device 102 or user 101. In one example, a computing system, e.g., transaction system 130, may maintain transaction data characterizing prior data exchanges involving client device 102 within one or more tangible, non-transitory memories, and may perform operations that process the transaction data to identify an expected occurrence of the data exchange and further, to determine expected values of parameters that characterize the expected occurrence of the data exchange.

The expected parameter values may include, but are not limited to, a time or date on which the data exchange is expected to occur, a range of times or dates during which the data exchange is expected to occur, or an expected geographic position or region associated with the data exchange. In certain aspects, transaction system 130 may transmit data identifying the expected occurrence of the data exchange, and the expected parameter values, to client device 102 across a communications network, e.g., network 120, using any of the communications protocols described herein.

Client device 102 may receive the data identifying and characterizing the expected occurrence of the data exchange from transaction system 130, and in some instances, may perform operations that determine a value of a local device parameter and further, establish a consistency between the determined parameter value and the expected parameter values. By way of example, the determined parameter value may correspond to a current date or time, and client device 102 may establish a consistency between the determined parameter value and the expected parameter values when the current date or time falls within the expected range of dates or times or alternatively, within a threshold time period of the expected date or time. In other instances, and as described below, the determined parameter value may correspond to a current geographic position of client device 102 (e.g., as determined by an integrated positional sensor or in response to a detection of a wireless signal broadcast by a beacon device of a proximity system), and client device 102 may establish the consistency between the determined parameter value and the expected parameter values when the current geographic positions is disposed within a threshold distance of the expected geographic position, and additionally or alternatively, is disposed within the expected geographic region.

When client device 102 establishes that the determined parameter value is consistent with the expected parameter values, client device 102 may perform operations that identify first interface element displayed within a graphical user interface (GUI), that modify one or more visual characteristics of the first interface element, and that present, within the GUI, the modified first interface element concurrently with a second interface element representative of the expected occurrence of the data exchange. In certain aspects, client device 102 may modify one or more dimensions of the first interface element, and may generate the second interface element, such that the modified first interface element and the second interface element are displayed within a portion of the GUI enclosed by a boundary of the displayed first interface element.

Further, and upon receipt of input data indicating a selection of the second interface element by user 101, client device 102 may perform operations that initiate a performance of the data exchange in accordance with the expected parameter values and without additional input from user 101, e.g., input data navigating through successively displayed interface screens or windows. By replacing a single interface element displayed on a GUI interface by multiple and functional interface elements, and by initiating the data exchange based on a selection of one of the multiple interface elements, certain of the disclosed embodiments may be implemented by mobile computing devices that incorporate display units characterized by limited sizes (e.g., smart phones, smart watches, etc.) or limited functionalities (e.g., wearable computing devices and other form factors, etc.), and can improve the ability of these mobile computing devices to display information and interact with corresponding users.

In certain aspects, and as outlined below, the data exchange may correspond to a payment transaction (e.g., a bill-payment transaction) that funds a regular invoice or bill issued by to user 101 by a wireless service provider, a local or municipal utility, an educational institution, or other business entity that provides goods or services to user 101. Data characterizing the regular invoice or bill, such as an outstanding balance or a payment, can be transmitted from a computing system maintained by an issuer of the regular invoice or bill (e.g., one of third party-computing systems 160) to transaction system 130, which aggregates the transmitted data with additional data characterizing other bills or invoices issued to user 101. Further, in some instances, user 101 may access the aggregated data characterizing each of the bills or invoices through a corresponding digital portal generated and presented to user 101 by client device 101, e.g., through a mobile application executed by client device 102 or through a web page accessed by a web browser executed by client device 102. In other aspects, and consistent with the disclosed embodiments, the payment transaction may correspond to a peer-to-peer (P2P) transaction in which client device 102 initiates a transfer of funds from the source account of user 101 to a target account held by another individual or a third party, e.g., in exchange for goods or services provided to user 101 by the individual or third party.

To initiate these and other examples of payment transactions, client device 102 may locally store and execute an application program, such as a mobile payment application provided by the financial institution that issued a source account held by user 101, e.g., a financial institution that operates transaction system 130. In one aspect, user 101 may access, via client device 102, a web page or other digital portal established, maintained, or operated by transaction system 130 (e.g., through a web service operated by server front-end of transaction system 130), and client device 102 may transmit a request for the mobile payment application across network 120 to transaction system 130. The transmitted request may, in some aspects, include data identifying user 101 and/or client device 102 (e.g., authentication credentials of user 101, a device identifier of client device 102, etc.), and transaction system 130 may authenticate an identity of user 101 and/or client device 102 based on a comparison of portions of the transmitted request with stored customer data identifying user 101 and/or client device 102 (e.g., portions of customer data 132 of FIG. 1). In response to a successful authentication, transaction system 130 may transmit the mobile payment application, along with certain data supporting the execution of the mobile payment application, across network 120 to client device 102.

Client device 102 may, in some instances, receive the mobile payment application and the supporting data from transaction system 130, and may perform operations that store the mobile payment application and the supporting data within one or more tangible, non-transitory memories. In one aspect, processor 104 of client device 102 may execute the stored mobile application, which causes client device 102 to perform operations that display, within a graphical user interface (GUI), one or more first interface elements representative of the mobile payment application and additionally or alternatively, one or more functionalities of the mobile payment application, as described below in reference to FIG. 2A.

Figure 2A:
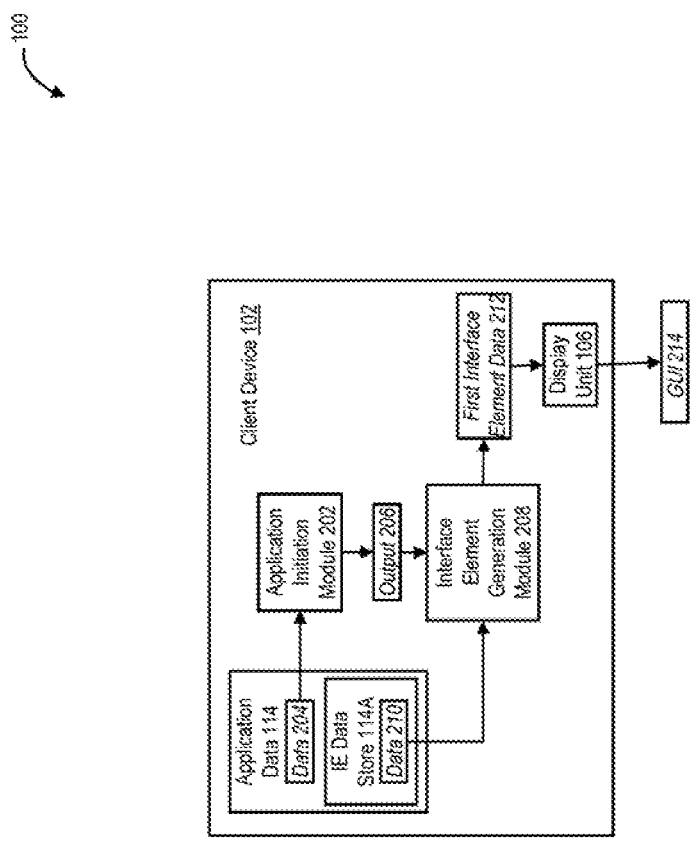
FIG. 2A is a diagram illustrating portions of an exemplary computing environment, consistent with the disclosed embodiments.

Referring to FIG. 2A, an application initiation module 202 of client device 102 may access stored application data 114, and may extract data 204 that characterizes the mobile payment application and its installation onto client device 102. For example, data 204 may identify a version of the mobile payment application, a time and date of its installation onto client device 102, and further, information identifying the supporting data and storage locations of the supporting data within the one or more tangible, non-transitory storage mediums. In certain aspects, application initiation module 202 may process portions of data 204 to confirm that the version of the mobile payment application is current and consistent with an operating system of client device 102 and further, to confirm a complete installation of the mobile payment application and that any supporting information is stored within the one or more tangible, non-transitory memories of client device.

If application initiation module 202 were to establish an inconsistency between the version of the mobile payment application and the operating system of client device 102, or identify an incomplete installation of the mobile payment application and/or the supporting data, client device 102 may generate and present, within a graphical user interface, an alert indicative of the inconsistent version or the incomplete installation (not depicted in FIG. 2A). In some instances, the alert may prompt user 101 to obtain an additional copy of the mobile payment application from transaction system 130, and perform any of the processes described above to re-install the mobile payment application on client device 102.

Alternatively, if application initiation module 202 were to establish the consistency of the version of the mobile payment application with the operating system of client device 102, and were to confirm the successful installation of the mobile payment application and the supporting data onto client device 102, transaction initiation module 202 may generate output data 206 indicative of the established consistency and the successful installation, and provide output data 206 to an interface element generation module 208.

In some aspects, interface element generation module 208 may process output data 206, which confirms the established consistency and the successful installation, and may also IE data store 112A to obtain information identifying and specifying one or more interface elements that represent the mobile payment application and/or functionalities of the mobile payment application. For example, interface element generation module 208 may extract data 210 identifying and specifying the one or more interface elements from IE data store 114, and may process portions of data 210 to generate first interface element data 212. In some aspects, interface element generation module 208 may provide first interface element data 212 to a display unit of client device 102, e.g., display unit 106, which may display the one or more interface elements to user 101 at corresponding positions on a graphical user interface, e.g., GUI 214, as described below in reference to FIG. 2B.

For example, as illustrated in FIG. 2B, the displayed interface elements may include, but are not limited to first interface element 222 and first interface element 242, each of which may be positioned by display unit 106 along a longitudinal edge of GUI 214. The disclosed embodiments are, however, to these exemplary interface-element positions, and in further aspects, display unit 106 may dispose first interface elements 222 and 242 (and other interface elements specified by first interface element data 212) at any additional or alternate position within GUI 214, including positions specified by user 101 in accordance with input data provided to client device 102.

For example, first interface element 222 may represent a bill-payment functionality of the executed mobile payment application, and first interface element 222 may be defined by a corresponding diameter 224A and a circumferential boundary 224B that encloses a corresponding portion of GUI 214. In certain aspects, and upon receipt of input data indicative of a selection of first interface element 222 by user 101 (e.g., based on an established contact between a portion of user 101's finger and the portion of GUI 214 enclosed by boundary 224B), client device 102 may perform operations that generate and present, within GUI 214, one or more successive screens or windows that prompt user 101 to provide input (e.g., through input unit 108 of client device 102) specifying values of various parameters of a bill-payment transaction (e.g., an identifier of an outstanding invoice, a source account, a transaction amount, a scheduled transaction date, etc.) and confirming the requested initiation of the bill-payment transaction in accordance with the specified parameter values.

Further, and as illustrated in FIG. 2B, first interface element 242 may represent a peer-to-peer (P2P) transaction functionality of the executed mobile payment application. For example, first interface element 242 may be defined by a corresponding diameter 244A and a circumferential boundary 244B that encloses a corresponding portion of GUI 214. In certain aspects, and upon receipt of input data indicative of a selection of first interface element 242 by user 101 (e.g., based on an established contact between a portion of user 101's finger and the portion of GUI 214 enclosed by element boundary 244B), client device 102 may perform operations that generate and present, within GUI 214, one or more successive screens or windows that prompt user 101 to provide input (e.g., through input unit 108 of client device 102) specifying values of parameters of a P2P transaction (e.g., an identifier of a payee (such as an email, etc.), a source account, a P2P transaction amount, a scheduled P2P transaction date, etc.) and confirming the requested initiation of the P2P transaction in accordance with the specified parameter values.

As described above, however, the limited dimensions of display units incorporated within many mobile communications devices (e.g., smart phones and smart watches) and the limited functionality of display units incorporated within many wearable computing devices (e.g., wearable form factors, etc.), may limit user 101's ability to navigate reliably and accurately through these successive screens or windows, and may reduce an accuracy of the input data provided by user 101. In some instances, the reduction in accuracy may correspond to an increase in an incidence of errors within the specified parameter values, and may require the provision of additional input data by user 101 that corrects and clarifies the erroneous parameter values, all of which collectively reduce a speed at which the executed mobile payment application initiates payment transactions in accordance with specified parameter values.

In other aspects, and as described below, client device 102 may obtain data that identifies an expected occurrence of a payment transaction, and further, that specifies expected values of transaction parameters that characterized the expected occurrence. The expected values of the transaction parameters may include, but are not limited, an expected transaction date or time, a range of expected transaction dates or times, an expected payment amount, and an expected funding source for the payment (e.g., data identifying a financial services account held by user 101). In one instances, client device 122 may receive the expected occurrence data from transaction system 130, which may analyze prior payment transactions involving client device 102 or user 101, and establish the expected occurrence of the payment transaction in accordance with an outcome of the analysis.

For example, and based on the stored transaction data (e.g., as maintained within transaction data 136 of FIG. 1) transaction system 130 may establish that due dates for prior Rogers™ Communications invoices issued to user 101 each fall of the fifteenth day of each month, and that user 101 provides input to client device 102 that initiates a bill-payment transaction for the full invoice balance on transaction dates ranging from the eleventh to the fourteenth day of each month. Further, and based on the processed transaction data, transaction system 130 may establish that user 101 elected to fund each of the prior initiated bill-payment transactions (e.g., in satisfaction of prior Rogers™ Communications invoices) using a checking account issued by the financial system associated with transaction system 130.

In some instances, and consistent with the disclosed embodiments, transaction system 130 may establish an expectation that user 101 will initiate a bill-payment transaction for the outstanding Rogers™ Communications invoice (e.g., which is due on May $15^{th}$) during a range of transaction dates between May $11^{th}$ and May $14^{th}$, in the entire invoiced amount (e.g., $85.00), and funded by user 101's checking account (e.g., as associated with an account number and a bank routing number specified within account data 134 of FIG. 1). Transaction system 130 may generate notification data that includes an identifier of the outstanding invoice associated with the expected occurrence (e.g., an account number with Rogers™ Communications, etc.) and expected values of the transaction parameters that characterize the bill-payment transaction for the outstanding Rogers™ Communications invoice (e.g., the expected range of transaction dates, the expected payment amount, the expected source account, etc.), and transmit the notification data across network 120 to client device 102.

Client device 102 may receive the notification data, and may determine whether a current date falls within the expected range of transaction dates for the bill-payment transaction that funds the outstanding Rogers™ Communications invoice. As described below in reference to FIG. 3, if client device 102 were to establish that the current date falls within the expected range of transaction dates, client device 102 may modify one or more visual characteristics of first interface element 222, and display, within GUI 214, the modified first interface element and a second interface element representative of the outstanding Rogers™ Communications invoice and the expected occurrence of the bill-payment transaction. In one instance, client device 102 may determine dimensions and/or shapes of the modified first interface element and the second interface element that facilitate a concurrent display of the modified first interface element and the second interface element within boundary 224B. Further, and upon receipt of input selecting the second interface element, client device 102 may perform operations that initiate the bill-payment transaction for the outstanding Rogers™ Communications invoice in accordance with the expected values of the transaction parameters and without the presentation of, and navigation through, successive screens or windows.

Figure 3:
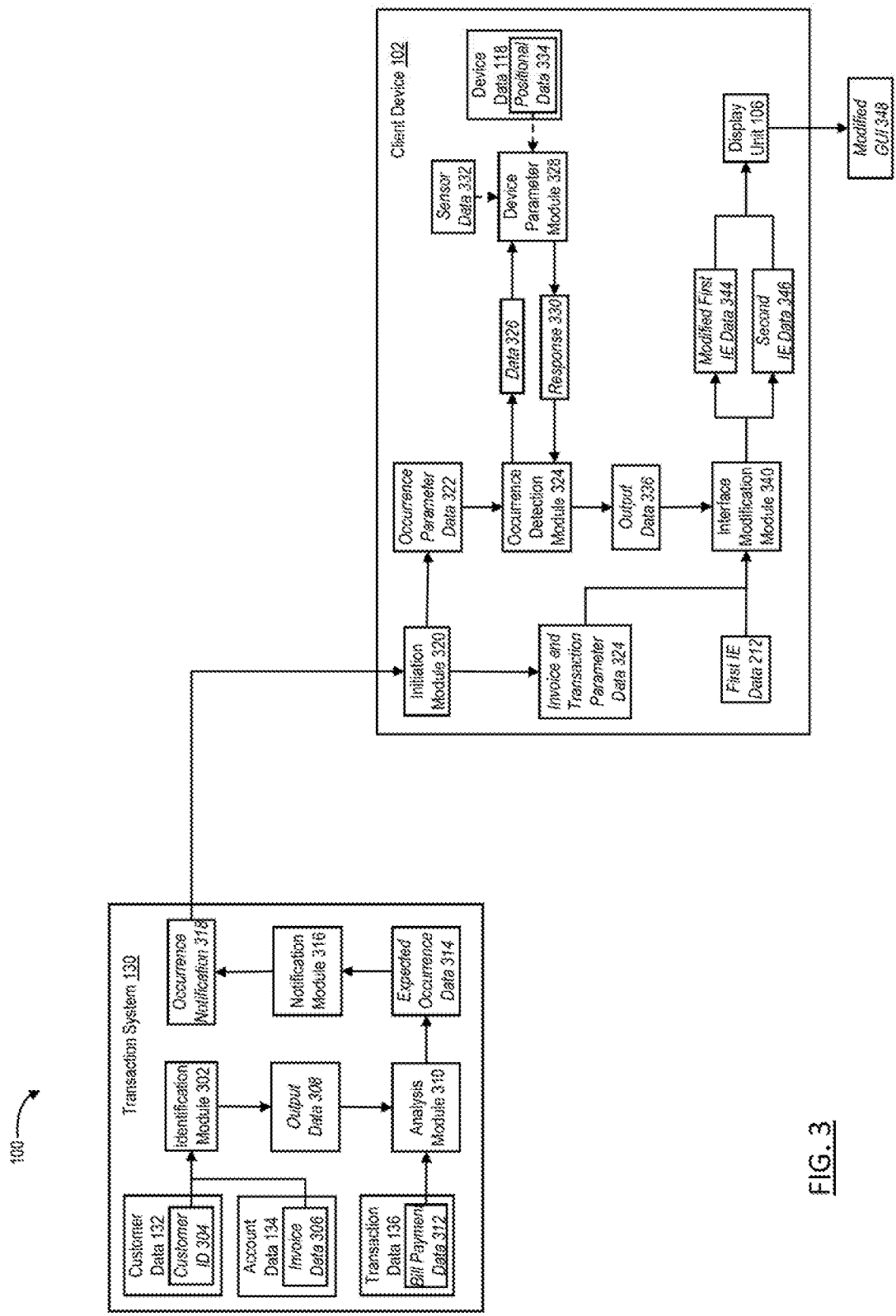
FIG. 3 is an additional diagram illustrating portions of an exemplary computing environment, consistent with the disclosed embodiments.

Referring to FIG. 3, an identification module 302 of transaction system 130 may access stored customer data 132, and extract a customer identifier 304 assigned to user 101 (e.g., a unique alpha-numeric character string, a user name, etc.). Identification module 302 may also access stored transaction data 136, and based on customer identifier 304, parse the accessed data to identify one or more outstanding invoices issued to user 101 by various wireless service providers, utilities, and other entities. Identification module 302 can extract outstanding invoice data 306 that identifies and characterizes each of the outstanding invoices issued to user 101.

For example, outstanding invoice data 306 may include, for each outstanding invoice issued to user 101, a payee identifier associated with the outstanding invoice (e.g., a payee name, an account number of user 101, etc.), an outstanding balance, a payment due date, and additionally or alternatively, payment instructions, such as data identifying a target financial services account designated by the payee to receive funds consistent with all of a portion of the outstanding balance. Identification module 302 may, in some instances, package customer identifier 304 (e.g., as extracted from customer data 132) and portions of outstanding invoice data 306 (e.g., as extracted from transaction data 136) into output data 308, which identification module 302 may provide to an analysis module 310.

In one aspect, analysis module 310 may process output data 308, and extract customer identifier 304 and the one or more payee identifiers associated with the outstanding invoices. Analysis module 310 may also access stored transaction data 136, and based on customer identifier 304 and the one or more payee identifiers, and parse the accessed transaction data to identify prior bill-payment transactions initiated by user 101 (e.g., associated with customer identifier 304) and involving the one or more payee identifiers (e.g., transactions initiated to pay prior invoices involving the one or more payee identifiers). In some instances, analysis module 310 may extract bill-payment data 312 that identifies and characterizes each of the identified prior bill-payment transactions. For example, bill-payment data 312 may include, for each of the identified prior bill-payment transactions, a corresponding payee identifier (e.g., the payee name, etc.), a payment amount, a payment date or time, or a source account of user 101 that funded the prior bill-payment transaction.

Analysis module 310 may, in some instances, process portions of bill-payment data 312 to identify an expected occurrence of a bill-payment transaction (e.g., an "expected" bill-payment transaction) that funds a corresponding one of the outstanding invoices, and to determine expected values of parameters that characterize the expected occurrence of the bill-payment transaction. By way of example, output data 308 may identify an outstanding invoice for wireless services provided to user 101 by Rogers™ Communications, which may be characterized by a payment amount of $85.00 and a payment due date of May 15, 2017, and bill-payment data 312 may include data characterizing prior bill-payment transactions that were initiated by user 101 over a prior time period, such as two years, and designated to fund prior monthly invoices issued by Rogers™ Communications during the prior time period. In certain aspects, analysis module 310 may perform operations that analyze bill-payment data 312 to identify patterns in certain parameter values that characterize the prior bill-payment transactions designated to fund the prior Rogers™ Communications invoices, and based on the identified patterns, predict an expected, future occurrence of a bill-payment transaction, which is characterized by expected parameter values that are consistent with the prior bill-payment transactions.

For example, and based on twenty-four prior bill-payment transactions funding prior Rogers™ Communications invoices (e.g., monthly invoices over a two-year pieces), analysis module 310 may determine that each of the prior Rogers™ Communications invoices specifies a payment due date that falls on the $15^{th}$ day of the corresponding month, and further, that user 101 initiated each of the prior bill-payment transactions during a time period bounded by $11^{th}$ and $14^{th}$ days of each corresponding month (e.g., between one and four days prior to the due date). Further, analysis module 310 may establish that each of the prior bill-payment transactions is characterized by a payment amount consistent with the outstanding invoice balance, and that a checking account held by user 101 and issued by the financial institution associated with transaction system 130 funded each of the prior bill-payment transactions.

Based on the analysis of the parameter-value patterns within prior bill-payment transactions, analysis module 310 may perform operations that predict user 101 will initiate a bill-payment transaction to fund the outstanding Rogers™ Communications invoice due May 15, 2017, during a between May $11^{th}$ and May $14^{th}$, will specify a payment amount corresponding to the outstanding invoice balance (e.g., $85.00), and will fund the payment amount from user 101's checking account. The disclosed embodiments are, however, not limited to these examples of parameter-value patterns analysis and detection processes, and in further aspects, analysis module 310 may apply any additional or alternate pattern analysis and detection algorithm to portions of bill-payment data 312, including one or more statistical analytical procedures, adaptive-learning techniques, or artificial intelligence processes appropriate to a sample size of data included within bill-payment data 312.

In some aspects, analysis module 310 may generate data, e.g., expected occurrence data 314, that identifies the expected occurrence of the bill-payment transaction that funds the outstanding Rogers™ Communications invoice. For example, expected occurrence data 314 may include, but is not limited to: (i) invoice data identifying the outstanding Rogers™ Communications invoice, such as an identifier of the outstanding Rogers™ Communications invoice, the May $15^{th}$ due date, and the outstanding balance of $85.00; (ii) expected values of occurrence parameters that characterize the expected occurrence, such as an expected transaction time or date, a range of expected transaction times or dates (e.g., expected transaction dates between May 11$^{th}$ and May 15$^{th}$), or an expected transaction location; and (iii) expected values of transaction parameters that characterize the bill-payment transaction, such as an expected payment amount (e.g., $85.00) and an identifier of a source account expected to fund the bill-payment transaction (e.g., an account number of user 101's checking account).

The disclosed embodiments are not limited to these examples of expected occurrence data, and in further aspects, expected occurrence data 314 may include any additional or alternate data that characterizes the outstanding Rogers™ Communications invoice and the expected occurrence of the bill-payment transaction that funds the outstanding Rogers™ Communications invoice. Further, although described above in terms of a single outstanding invoice that reflects wireless services provided to user 101 by Rogers™ Communications, transaction system 130 may perform any of the processes described above to predict an expected occurrence of a bill-payment transaction that funds any additional or alternate outstanding invoice identified within output data 308, or any additional or alternate number of such outstanding invoices.

Referring back to FIG. 3, analysis module 310 may provide expected occurrence data 314 as an input to notification module 316, which may package portions of expected occurrence data 314 into an occurrence notification 318. Transaction system 130 may, in some aspects, transmit occurrence notification 318 across network 120 to client device 102. In some instances, an initiation module 320 of client device 102 may receive occurrence notification 318 from transaction system 130, and may perform operations that identify, and extract from occurrence notification 318, occurrence parameter data 322 identifying expected values of occurrence parameters that characterize the expected occurrence of the bill-payment transaction. The expected values of the occurrence parameters may include, but are not limited to, an expected transaction time or date for the bill-payment transaction, a range of expected transaction times or dates for the bill-payment transaction, and additionally or alternatively, an expected geographic position of a client device, e.g., client device 102, during an initiation of the bill-payment transaction. Initiation module 320 may provide occurrence parameter data 322 as an input to occurrence detection module 324.

In response to the receipt of occurrence parameter data 322, occurrence detection module 324 may perform operations that determine whether a current state of client device 102, as specified by values of certain device parameters, is consistent with the expected values of the occurrence parameters specified within occurrence parameter data 322. For example, occurrence detection module 324 may process occurrence parameter data 322 to identify the expected values of the occurrence parameters, and to generate data 326 requesting values of that device parameters that correspond to the occurrence parameters. Occurrence detection module 324 may, in some instances, provide data 326 as an input to a device parameter module 328, which may perform operations that determine the requested values of the device parameters, package the determined values into a response 330 for provision to occurrence detection module 324.

For example, and as described above, the expected values of the occurrence parameters may indicate that transaction system 130 expects user 101 to initiate the bill-payment transaction funding the outstanding Rogers™ Communications invoice between May 11$^{th}$ and May 14$^{th}$. Based these expected values and on these occurrence parameters, occurrence detection module 324 may generate data 326 that requests the value of the current date, and provide data 326 as an input to device parameter module 328. Device parameter module 328 may, in some instances, provide response 330 as input to occurrence detection module 324, which may perform operations that determine whether the current date, e.g., May 12$^{th}$, is consistent with the expected range of transaction dates for the bill-payment transaction that funds the outstanding Rogers™ Communications invoice, e.g., transaction dates from May 11$^{th}$ through May 14$^{th}$.

The disclosed embodiments are, however, not limited to occurrence parameters that specify an expected transaction date or time, or alternatively, a range of expected transaction dates or times, and in other aspects, occurrence parameter data 322 may identify additional or alternate occurrence parameter values that characterize the bill-payment transaction. For example, occurrence parameter data 322 may specify expected geographic position of client device 102 during the initiation of the bill-payment transaction, and occurrence detection module 324 may generate data 326 that requests the value of the current device location, and provide data 326 as an input to device parameter module 328, which may perform operations that determine a current geographic location of client device 102 and return the current geographic location of client device 102 within response 330.

For example, client device 102 may include one or more positional sensors, such as a global positioning system (GPS) unit (not depicted in FIG. 3), which provides sensor data 332 identifying the current geographic position of client device 102 at discrete time intervals to device parameter module 328. Device parameter module 328 may receive sensor data 332, which specifies the current geographic position of client device 102 at corresponding time intervals, and may store portions of sensor data within one or more tangible, non-transitory memories, e.g., as positional data 334 within device data 118. In some aspects, the storage of the time-varying geographic location of client device 102 within positional data 334 may establish a positional log of a movement of client device 102 within one or more geographic regions, and upon receipt of data 326, device parameter module 328 may access positional data 334, determine the current geographic location of client device 102 (e.g., the most recent geographic location obtained from sensor data 332), and provide the determined geographic location to occurrence detection module 324 as a portion of response 330, as described above.

In other instances, client device 102 may be in communication with one or more external positional sensors or proximity system devices, which may provide data to device parameter module 328 that facilitates a determination of the current geographic location of client device 102. For example, communications unit 110 of client device 102 may receive positional data from the one or more of the external positioning sensors at regular temporal intervals, and portions of the received positional data (e.g., the geographic location of client device 102 at a corresponding time interval) may be incorporated into sensor data 332 and received by device parameter module 328, as described above.

Further, in additional instances, communications unit 110 of client device 102 may detect a wireless signal broadcast by a device of a proximity system across a short-range communications network, such as a proximity beacon disposed at a corresponding geographic location along an interstate roadway, within a city grid, or within a shopping mall. The short-range communications network may, for example, include a network configured to transmit data in accordance with near-field communications (NFC) protocols or radio-frequency (RF) protocols, and client device 102 may perform operations that correlate the detected wireless signal to the corresponding geographic location (e.g., based on correlation data provided to client device 102 by an operator of the proximity system), and establish the correlated geographic location of the proximity system device as the current geographic position of client device 102. Device parameter module 328 may, by way of example, store the current geographic location of client device 102 within a corresponding portion of positional data 334, along with temporal data identifying a particular time at which client device 102 detected the broadcasted wireless signal, as described above.

Referring back to FIG. 3, occurrence detection module 324 may receive response 330, and may perform operations that determine whether the device parameter values specified within response 330 are consistent with the expected values of the occurrence parameters, e.g., as specified within occurrence parameter data 322. For example, and as described above, the expected values of the occurrence parameters may indicate that transaction system 130 expects user 101 to initiate the bill-payment transaction funding the outstanding Rogers™ Communications invoice between May $11^{th}$ and May $14^{th}$, and the device parameter values may specify a current date of May $12^{th}$. In certain instances, and consistent with the disclosed embodiments, occurrence detection module 324 may determine that the current date of May $12^{th}$ is disposed within the expected range of transaction dates, e.g., May $11^{th}$ to May $14^{th}$, and accordingly, establish that the device parameter values are consistent with the expected values of the occurrence parameters. In response to the established consistency, occurrence detection module 324 may generate output data 336 that confirms the established consistency, and provide output data 336 to interface modification module 340, which performs operations that dynamically and selectively modify portions of GUI 214 to include interface elements that, when selected by user 101, initiate a performance of the bill-payment transaction funding the outstanding Rogers™ Communications in accordance with the expected values of the transaction parameters, as described below.

For example, and as illustrated in FIG. 3, interface modification module 340 may receive output data 336, which establishes the consistency between the device parameter values and the expected values of the occurrence parameters that characterize the bill-payment transaction funding the outstanding Rogers™ Communications invoice. In response to the established consistency, interface modification module 340 may obtain, from initiation module 320, invoice and transaction parameter data 342 that includes invoice data characterizing the outstanding Rogers™ Communications invoice (e.g., the payee name, the outstanding balance of $85.00, and the May $15^{th}$ due date), along with values of transaction parameters that characterize the expected occurrence of the payment transaction. By way of example, the transaction parameter values may include, but are not limited to, the expected payment amount (e.g., the outstanding balance of $85.00) and the source account expected to fund the payment transaction (e.g., an account number or bank routing number of user 101's checking account), a target account (e.g., an account number or bank routing number of an account designed by the payee to receive the expected payment amount), and values of any additional or alternate transaction parameters that facilitate an initiation of the payment transaction by the executed mobile payment application. In certain aspects (not depicted in FIG. 1), interface modification module 340 may perform operations that store a portion of invoice and transaction parameter data 342 within one or more tangible, non-transitory memories, e.g., within local transaction data 118 of data repository 112.

In further response to the established consistency, interface modification module 340 may also access locally stored data that characterizes and specifies previously displayed interface elements representative of the executed mobile payment application, e.g. first interface element data 212. As described above, first interface element data 212 may include a value of one or more display parameters of an interface element previously presented within GUI 214, such as first interface element 222 representative of the bill-payment functionality of the executed mobile payment application.

For example, as described above in reference to FIG. 2B, first interface element 222 may be displayed on GUI 214 as a circular icon characterized by diameter 224A, a center disposed at a corresponding position within GUI 214, and circumferential boundary 224B that encloses a corresponding portion of GUI 214. In certain aspects, first interface element data 212 may include information that specifies the shape of first interface element 222 (e.g., the circular icon) and dimensions of first interface element 222, such as a length of diameter 224A (e.g., in pixels or millimeters). First interface element data 212 may also include information that specifies a position first interface element 222 within GUI 214, such as data mapping the center of the circular icon to a corresponding position within GUI 214 and/or positions along boundary 224B to corresponding positions within GUI 214. Further, in some instances, first interface element data 212 may also include additional data specifying one or more visual characteristics of first interface element 222 (e.g., a color, etc.) and images or contextual data presented within first interface element 222, along with their relative display positions within first interface element 222. The disclosed embodiments are, however, not limited to these examples of interface element data, and in other aspects, first interface element data 212 may include any additional or alternate data that enables display unit 106 to render and display first interface element 222 within GUI 214.

In an embodiment, Interface modification module 340 may modify a value of one or more of the display parameters or the visual characteristics of first interface element 222 in response to the established consistency between the device parameter values and the expected values of the occurrence parameters (e.g., that characterize the bill-payment transaction funding the outstanding Rogers™ Communications invoice). Interface modification module 340 may also generate modified first interface element data 344 that specifies the values of the modified displayed parameters or the modified visual characteristics. For example, interface modification module 340 may establish, as the modified shape of first interface element 222, a semi-circular segment of first interface element 222 bounded by diameter 224A and portion of circumferential boundary 224B extending between the endpoints of diameter 224A.

Consistent with the disclosed embodiments, interface modification module 340 may generate modified first interface element data 344 that specifies the modified shape of first interface element 222 (e.g., the semi-circular segment), the length of diameter 224A (e.g., in pixels or millimeters), and the position of the segment within boundary 224B. Additionally, in certain instances, modified first interface element data 344 may also include data characterizing one or more visual characteristics of the modified first interface element (e.g., a color) and additionally or alternatively, identifiers of images or contextual data presented within modified first interface element, along with the relative display positions of the images or contextual data within the modified first interface element.

Further, and as described below, interface modification module 340 may also perform operations that determine values of display parameters or visual characteristics of a second interface element representative of the expected payment transaction, which funds the outstanding Rogers™ Communications invoice, and generate second interface element data 346 that specifies the determined values of the display parameters or the visual characteristics. For example, interface modification module 340 may establish, as the shape of the additional interface element, another semi-circular segment of first interface element 222 bounded by diameter 224A and an additional portion of boundary 224B extending between the endpoints of diameter 224A. In some instances, interface modification module 340 may generate second interface element data 346 that specifies the established shape of the second interface element (e.g., the additional semi-circular segment), the length of diameter 224A, and a display position of the additional interface element within GUI 214.

In one instance, interface modification module 340 may determine the shape of the second interface element and the display position of the second interface element within GUI 214 based on the displayed position of first interface element 222 within GUI 214, data that maps positions along boundary 224B to corresponding positions within GUI 214 (e.g., as specified within first interface element data 212 and further, portions of modified first interface element data 344 that specify the shape and position of the modified first interface element within GUI 214. As described below, interface modification module 340 may selectively determine the shape and the display position of the second interface element (and additionally or alternatively, the shape and display position of the modified first interface element) in a manner that facilitates a concurrent display of the modified first interface element and the second interface element within initial boundary 224B of first interface element 222. The disclosed embodiments are, however, not limited to these exemplary element shapes and display positions, and in further aspects, interface modification module 340 may establish any additional or alternate shape or display positions of the modified first interface element or the second interface element that would be appropriate to the mobile payment applications and to a size and functionality of display unit 106.

Interface modification module 340 may also determine the suitability of certain contextual information identifying the outstanding Rogers™ Communications invoice, such as the payee name (e.g., Rogers™ Communications) and the May 15$^{th}$ due date, for display on a portion of the second interface element within GUI 214. In certain aspects, interface modification module 340 may generate additional portions of second interface element data 346 that specify the contextual information (e.g., the payee name of Rogers™ Communications and the May 15$^{th}$ due date) along with visual characteristics of the displayed contextual information, such as a font size, a font color, or a display position of the contextual information within the second interface element.

Referring back to FIG. 3, interface modification module 340 may provide modified first interface element data 344 and second interface element data 346 as inputs to display unit 106. In certain instances, display unit 106 may be configured to display the modified first interface element and the second interface element on GUI 214 in accordance with corresponding ones of the determined display parameters and visual characteristics (e.g., as specified in modified first interface element data 344 and second interface element data 346), which may collectively establish a modified GUI 348. By way of example, display unit 106 may "split" previously displayed first interface element 222 into multiple interface elements on modified GUI 348 that include, but are not limited to the modified first interface element associated with the bill-payment functionality of the mobile-payment application and the second interface element associated with the outstanding Rogers™ Communication invoice and the expected occurrence of the bill-payment transaction that funds the outstanding invoice, as described below in reference to FIG. 4A.

Figure 4C:
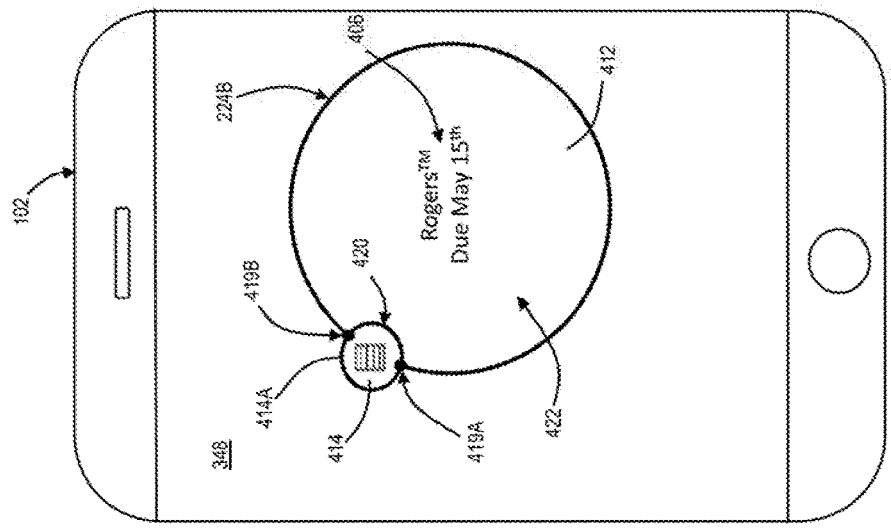
FIGS. 4A-4F are additional diagrams of exemplary graphical user interfaces, consistent with the disclosed embodiments.
Figure 4B:
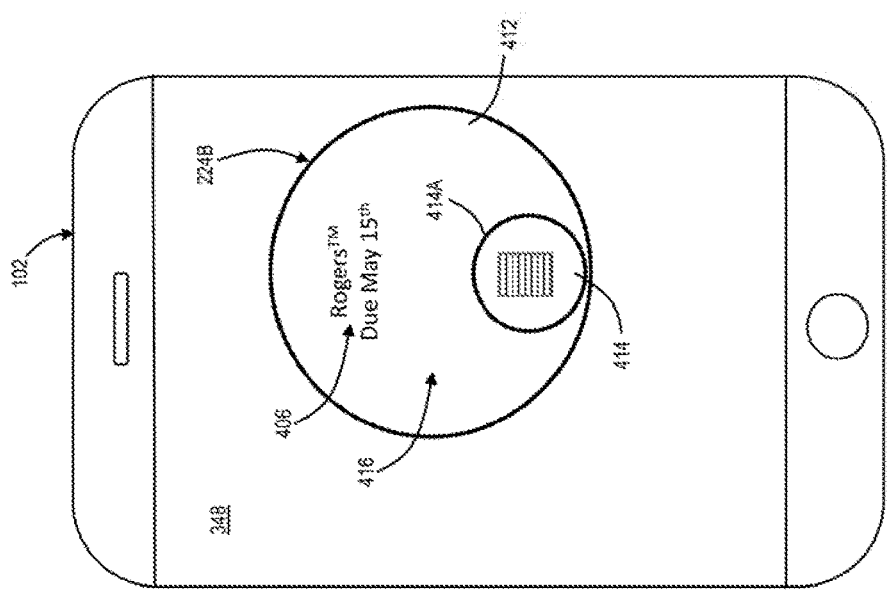
Figure 4A:
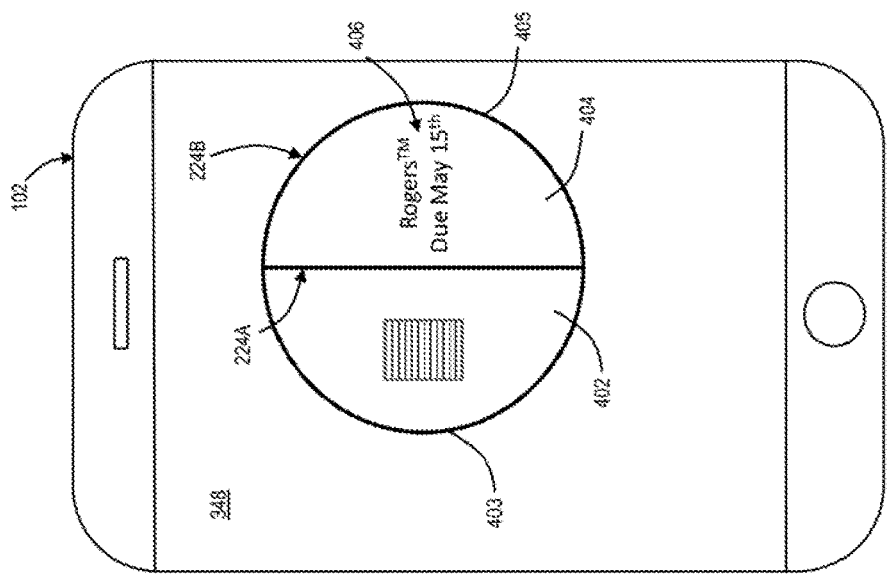

Referring to FIG. 4A, display unit 106 may present, on GUI 214, a modified first interface element 402 and a second interface element 404 within boundary 224B of previously displayed first interface element 222. As described above, modified first interface element 402 and a second interface element 404 may each represent a corresponding semi-circular segment of first interface element 222 (e.g., as illustrated in FIG. 2B), and may be disposed within GUI 214 such that modified first interface element 402 is bounded by an arc portion 403 of boundary 224B and by diameter 224A, and second interface element 404 is bounded by an arc portion 405 of boundary 224B and by diameter 224A. Further, in some aspects, display unit 106 may be configured by second interface element data 344 to display, within second interface element 404, contextual information 406 that identifying a payee of the associated outstanding invoice (e.g., Rogers™ Communication) and the due date of that outstanding invoice (e.g., May 15$^{th}$). Although not depicted in FIG. 4A, second interface element data 346 may identify, and display unit 106 may display, any additional or alternate contextual data appropriate to the outstanding invoice and the size of functionality of display unit 106, such as an outstanding balance of the invoice, an identifier of a source account expected to fund the outstanding invoice (e.g., user 101's checking account), or any image or logo associated with the payee.

In some embodiments, user 101 may establish contact between a portion of a finger (or alternatively, a portion of stylus) and a portion of GUI 214 bounded by arc portion 405 and diameter 224A, which corresponds to second interface element 404. Client device 102 may detect the established contact, e.g., via input unit 108, and may determine that the established contact corresponds to a selection of second interface element. Further, and in response to the determination, the executed mobile payment application may cause client device 102 to perform operations that initiate the bill-payment transaction to fund the outstanding Rogers™ Communication invoice in accordance with the expected values of the transaction parameters (e.g., the payment amount of $85.00, the source account corresponding to user 101's checking account, and the target account designated by the payee, as described above). In certain aspects, and by initiating the expected bill-payment transaction in response to a single input provided to client device 102, not based on input provided in response to multiple interface elements disposed across successively displayed interface screens or windows, certain of the disclosed embodiments may enhance an ability of user 101 to interact with graphical user interfaces presented by limited-size display units (e.g., those incorporated within smart phones, smart watches, etc.) or limited-functionality display units (e.g., those incorporated within wearable computing devices and other form factors, etc.).

The disclosed embodiments are, however, not limited to process that "split" a presented interface element representative of the bill-payment functional of the mobile payment application into multiple interface elements, such as the semi-circular segments of the first interface element 222 described above. In additional aspects, and in response to the established consistency between the device parameter values and the expected occurrence values, client device 102 may perform any of exemplary processes described herein to generate and display, on modified GUI 348, a second interface element representative of the outstanding Rogers™ Communication invoice and the bill-payment transaction expected to fund the outstanding invoice, to modify a dimension of first interface element 222 and generate a modified first interface element, and to display the modified first interface at a position on modified GUI 348 that overlays a portion of the displayed second interface element, as described below in reference to FIGS. 4B and 4C.

For example, as illustrated in FIG. 4B, display unit 106 may display a second interface element 412 at a position within modified GUI 348 that is consistent with the display position of first interface element 222 in GUI 214 (e.g., as depicted in FIG. 2B). Second interface element 412 may, in some instances, be characterized by a circular shape having dimensions consistent with first interface element 222, and may be associated with a circumferential boundary that corresponds to boundary 224B of first interface element 222. Further, and in additional aspects, display unit 106 may also display a modified first interface element 414 at a corresponding display position within modified GUI 348 such that a circumferential boundary 414A of modified first interface element 414 falls entirely within boundary 224B (or alternatively, is coincident with at least a portion of boundary 224B). By way of example, and as depicted in FIG. 4B, a shape of modified first interface element 414 may be consistent with the circular shape of first interface element 222, while a diameter of modified first interface element 414 may correspond to a predetermined fraction of diameter 224A (e.g., as specified by user 101 or as specified by transaction system 130 during the provision of data supporting the mobile payment application) or alternatively, by a variable fraction adaptively determined by client device 102 based on, among other things, a size, resolution, or functionality of display unit 106 and/or a presence of additional displayed elements within GUI 214. For example, the predetermined or adaptively determined fraction may correspond to 15% of diameter 224A, 25% of diameter 224A, 50% of diameter 224A, or any additional or alternatively fraction appropriate to display unit 106.

As further illustrated in FIG. 4B, the disposition of modified first interface element 414 within boundary 224B of second interface element 412 may establish a region 416 within modified GUI 348 that is disposed between and bounded by circumferential boundaries 224B and 414A (e.g., an annular region or a semi-annular region). In some aspects, user 101 may establish contact between a portion of a finger (or alternatively, a portion of stylus) and a portion of region 416, and client device 102 may detect the established contact, e.g., via input unit 108, determine that the established contact corresponds to a selection of second interface element 412, and in response to the determination, the executed mobile payment application may cause client device 102 to perform operations that initiate the bill-payment transaction to fund the outstanding Rogers™ Communication invoice in accordance with the expected values of the transaction parameters, as described above.

In other embodiments, display unit 106 may display a modified first interface element 414 at a corresponding display position within modified GUI 348 such that circumferential boundary 414A of modified first interface element 414 intersects boundary 224B. For example, as illustrated in FIG. 4C, boundary 224B may intersect boundary 414A at corresponding intersection points 419A and 419B, which may establish an arc portion 420 of boundary 414A, and which may define a region 422 of GUI 214 that is disposed within and bounded by arc portion 420 and boundary 224B. In some aspects, and as described above, user 101 may establish contact between a portion of a finger (or alternatively, a portion of stylus) and a portion of region 422, and client device 102 may detect the established contact, e.g., via input unit 108, determine that the established contact corresponds to a selection of second interface element 412, and in response to the determination, the executed mobile payment application may cause client device 102 to perform any of the processes described herein to initiate the bill-payment transaction to fund the outstanding Rogers™ Communication invoice in accordance with the expected values of the transaction parameters.

In additional aspects, both modified first interface element (e.g., representative of the bill-payment functionality of the mobile payment application) and the second interface element (e.g., representative of the outstanding Rogers™ Communication invoice and the bill-payment transaction expected to fund the outstanding invoice) may be characterized by a shape and by dimensions that are consistent with first interface element 222 within GUI 214. For example, modified first interface element data 344 and second interface element data 346 may configure display unit 106 to display the modified first interface at a position on modified GUI 348 that overlays and obscures all or a portion of the displayed second interface element, and in response a certain type of input provided to client device 102, client device 102 may perform operations that remove the overlaid modified first interface element and expose to displayed second interface element for selection by user 101, and described below in reference to FIGS. 4D and 4E.

Figure 4F:
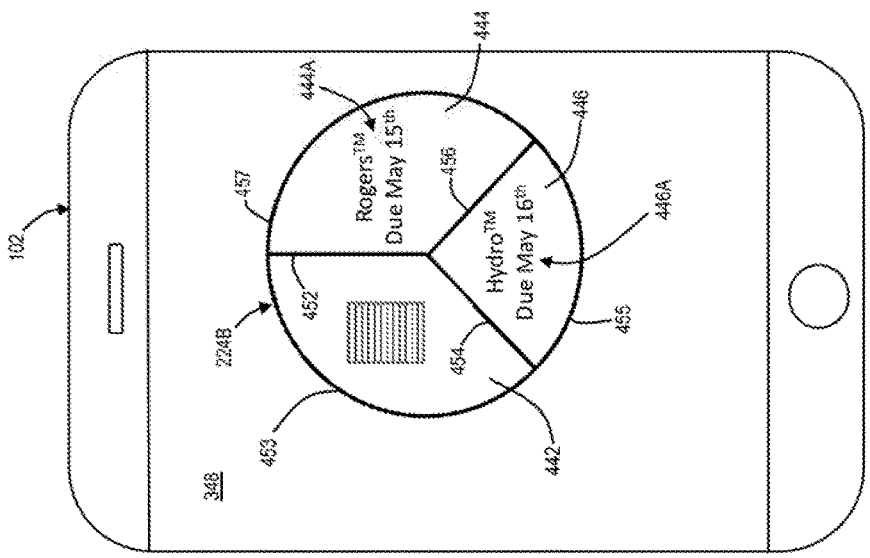
Figure 4E:
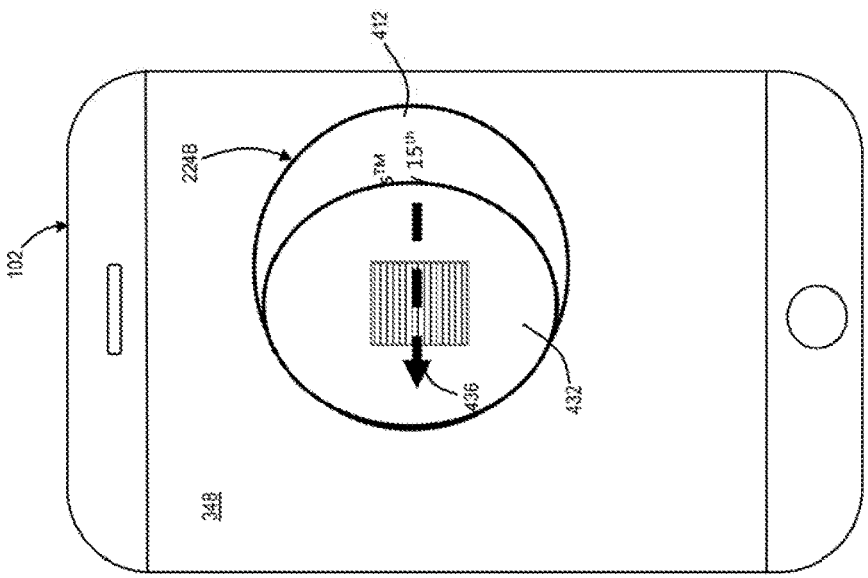
Figure 4D:
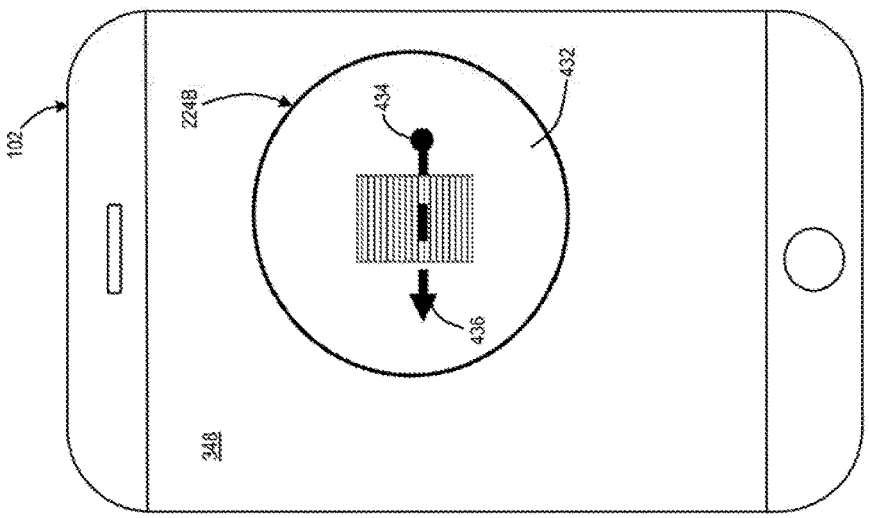

For example, and referring to FIG. 4D, display unit 106 may dispose a circular-shaped, modified first interface element 432 at a display position within modified GUI 348 such that modified interface element 432 complete obscures (or alternatively, partially obscures) displayed second interface element 412 from view by user 101. In one instance, user 101 may establish contact between a portion of a finger (or alternatively, a portion of stylus) and a surface of display unit 106 at a contact position 434 disposed within a portion of modified GUI 348 enclosed by boundary 224B, and while maintaining the established contact, swipe across the surface of display unit 106 in a direction 436. Client device 102 may receive data indicative of the swiping motion (e.g., via input unit 108), and in response to the detected swiping motion, may generate instructions that cause display unit 106 to remove the overlay and expose second interface element 412 for selection by user 101, as illustrated in FIG. 4E. For example, as depicted in FIG. 4E, client device 102 may perform operations that generate, and provide to display unit 106, additional interface element data that, when rendered for display, animates the removal of the overlay and "peels" back modified first interface element 432 in direction 436.

Although described in terms of a detected swiping motion of user 101's finger or stylus across the surface of display unit 106, the disclosed embodiments are not limit to processes that trigger a removal of an overlaid interface element based this exemplary user input. In other instances, client device 102 may instruct display unit 106 to remove, or peel back, an overlaid interface element in response to other user inputs, such a successive establishment of contact between user 101's finger of stylus and the surface of display unit 106 at positions along GUI 214 enclosed by boundary 224B (e.g., a double tap of user 101's finger), a hand gesture or facial expressions detected by a digital camera incorporated into client device 102, or one or more verbal commands spoken by user 101, which can be captured by an appropriate audio interface (e.g., a microphone integrated into client device 102), and processed by an appropriate voice-recognition and characterization process, such as a virtual assistant application executed by client device 102.

Further, and as described above, client device 102 may determine that current values of one or more device parameters (e.g., a current date) are consistent and fall within a range of expected dates on which transaction system 130 predicts user 101 will initiate bill-payment transaction to fund an outstanding invoice, such as the outstanding Rogers™ Communication invoice due on May $15^{th}$ and identified within occurrence notification 318. In other aspects, and consistent with the disclosed embodiments, transaction system 130 may perform any of the exemplary processes described above to identify additional outstanding invoices issued to user 101 and available for payment using the executed mobile payment application, e.g., an invoice for electrical services provided to user 101 by Toronto Hydro™ and due on May $16^{th}$.

Using any of the exemplary processes described above, transaction system 130 may analyze locally stored transaction data characterizing prior bill-payment transactions that funded prior Toronto Hydro™ invoices (e.g., within bill-payment data 312), and may generated additional elements of expected occurrence data for the outstanding Toronto Hydro™ invoice. For example, the additional elements or occurrence data may specify, for the outstanding Toronto Hydro™ invoice: an invoice identifier or an identifier of user 101's account with Toronto Hydro™; the due date of the invoice (e.g., May $16^{th}$); the outstanding invoice balance (e.g., an outstanding balance of $37.50); values of occurrence parameters that characterize the expected occurrence (e.g., a range of expected transaction dates between May $11^{th}$ and May $16^{th}$); and expected values of transaction parameters that characterize the bill-payment transaction, such as an expected payment amount (e.g., $37.50) and an identifier of a source account expected to fund the bill-payment transaction (e.g., an account number of user 101's checking account). As described above, transaction system 130 may package portions of the additional expected occurrence data, along with expected occurrence data 314 that characterizes the outstanding Rogers™ Communications invoice, into occurrence notification 318, which transaction system 130 may transmit across network 120 to client device 102.

In some aspects, client device 102 may perform any of the exemplary processes described above to establish a consistency between the current values of the device parameters (e.g., the current date of May $12^{th}$, as determined by device parameter module 328 of FIG. 3) and the values of the occurrence parameters that characterize the expected occurrence of the bill-payment transaction that funds the outstanding Toronto Hydro™ invoice (e.g., a range of expected transaction dates between May $11^{th}$ and May $16^{th}$). In response to the established consistency, client device 102 may perform any of the exemplary processes described above (e.g., as described above in reference to second interface element data 346) to generate third interface element data that specifies values of display parameters and visual characteristics of a third interface element representative of the outstanding Toronto Hydro™ invoice and the bill-payment transaction expected to fund that additional, outstanding invoice.

As described above, display unit 106 may receive the third interface element data, in conjunction with modified first interface element data 344 and second interface element data 346, and perform operations that display the modified first interface element (e.g., representative of the bill-payment functionality of the mobile payment application), the second interface element (e.g., representative of the outstanding Rogers™ Communications invoice and the bill-payment transaction expected to fund that outstanding invoice), and a third interface element (e.g., representative of the outstanding Toronto Hydro™ invoice and the bill-payment transaction expected to fund that outstanding invoice) on modified GUI 348 in accordance with corresponding ones of the determined display parameters and visual characteristics.

In certain aspects, and as illustrated in FIG. 4F, display unit 106 may "split" previously displayed first interface element 222 into three interface elements that include, but are not limited to a modified first interface element 442 associated with the bill-payment functionality of the mobile-payment application, a second interface element 444 associated with the outstanding Rogers™ Communication invoice and the expected occurrence of the bill-payment transaction that funds the outstanding invoice, and a third interface element 446 associated with the outstanding Toronto Hydro™ invoice and the expected occurrence of the bill-payment transaction that funds that outstanding invoice. By way of example, modified first interface element 442 may correspond to a first segment of first interface element 222 bounded by radii 452 and 454 and arc portion 453, e.g., as defined by the intersection of radii 452 and 454 and boundary 224B. Similarly, second interface element 444 may correspond to a second segment of first interface element 222 bounded by radii 452 and 456 and arc portion 457 (e.g., as defined by the intersection of radii 452 and 456 and boundary 224B), and third interface element 446 may correspond to a third segment of first interface element 222 bounded by radii 454 and 456 and arc portion 455 (e.g., as defined by the intersection of radii 454 and 456 and boundary 224B). Further, second interface element 444 may include contextual information 444A identifying a payee of the associated outstanding invoice (e.g., Rogers™ Communication) and the due date of that outstanding invoice (e.g., May $15^{th}$), and third interface element 446 may include contextual information 446A identifying a payee of the associated outstanding invoice (e.g., Toronto Hydro™) and the due date of that outstanding invoice (e.g., May $16^{th}$).

In some embodiments, user 101 may establish contact between a portion of a finger (or alternatively, a portion of stylus) and a portion of modified GUI 348 bounded by radii 452 and 456 and arc portion 457, which corresponds to second interface element 444. Client device 102 may detect the established contact, e.g., via input unit 108, and may determine that the established contact corresponds to a selection of second interface element 444. Further, and in response to the determination, the executed mobile payment application may cause client device 102 to perform operations that initiate the bill-payment transaction to fund the outstanding Rogers™ Communication invoice in accordance with the expected values of the transaction parameters (e.g., the payment amount of $85.00, the source account corresponding to user 101's checking account, and the target account designated by the payee, as described above).

Additionally or alternatively, user 101 may also establish contact between a portion of the finger (or alternatively, a portion of the stylus) and a portion of modified GUI 348 bounded by radii 454 and 456 and arc portion 455, which corresponds to third interface element 446. Client device 102 may detect the established contact, e.g., via input unit 108, and may determine that the established contact corresponds to a selection of third interface element 446. Further, and in response to the determination, the executed mobile payment application may cause client device 102 to perform operations that initiate the bill-payment transaction to fund the outstanding Toronto Hydro™ invoice in accordance with the expected values of the transaction parameters (e.g., the payment amount of $37.50, the source account corresponding to user 101's checking account, and the target account designated by the payee, as described above).

Although described in terms of two outstanding invoices (e.g., the outstanding Rogers™ Communications and Toronto Hydro™ invoices), the executed mobile payment application may cause client device 102 to perform operations that modify or "split" displayed first interface element 222 to include any additional or alternate number of interface element associated with corresponding outstanding invoices and expected occurrences of bill-payment transactions that would be appropriate to the size and functionality of display unit 106. Further, the disclosed embodiments are not limited to processes that modify GUI 214 to include interface elements associated with expected payment transactions that fund outstanding invoices (e.g., as submitted by or on behalf of user 101 and other customers participating in bill-payment services provided by the financial institution that operates transaction system 130), and in further aspects, client device 102 and/or transaction system 130 may perform any of the exemplary processes described herein to generate and display interface elements representative of any additional or alternate transaction that involves user 101 or client device 102.

Figure 5A:
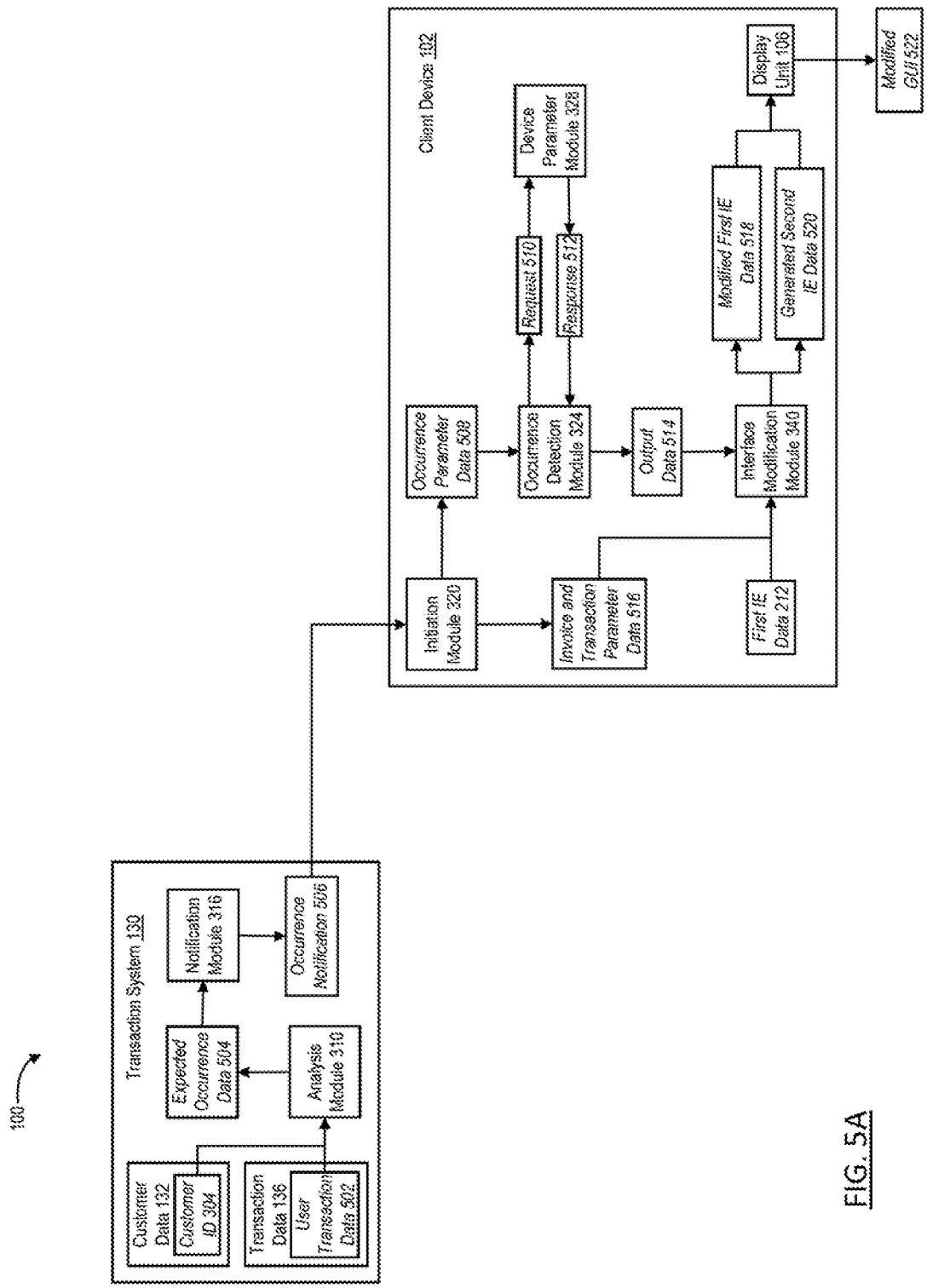
FIG. 5A is an additional diagram illustrating portions of an exemplary computing environment, consistent with the disclosed embodiments.

For example, transaction system 130, or client device 102, may perform also operations that identify expected occurrences of any additional or alternate transaction involving user 101 and/or client device 102, such as peer-to-peer (P2P) transactions initiated by client device 102 or deposit transactions initiated by user 101 at a physical branch of the financial institution, based on an analysis of transaction data locally maintained within one or more tangible, non-transitory memories, as described below in reference to FIG. 5A. For example, user 101 may reside in an apartment building, and may engage a resident of that apartment to walk and provide exercise to user 101's dog at specified times during each workday. In exchange for these services, user 101 may agree to provide $50.00 to the resident per week, and user 101 may provide input to client device 102 on a weekly basis that initiates a performance of a peer-to-peer (P2P) transaction transferring $50.00 in funds from user 101's checking account to the resident.

In certain instances, as described above, user 101 may provide input to client device that selects first interface element 242 of FIG. 2B, which represents a peer-to-peer (P2P) transaction functionality of the executed mobile payment application. In response to the selection, user 101 may provide additional input that specifies the transaction amount (e.g., the weekly sum of $50.00), an identifier of a source account for the transaction (e.g., an account number or bank routing number of user 101's checking account), and an identifier of the resident (e.g., the resident's email address, etc.), and further, requests the initiation of the P2P transaction in accordance with the specified parameters. In some aspects, to provide the additional input, user 101 may navigate through multiple and successively displayed screens or windows, which may prompt user 101 to input corresponding portions of the parameter values characterizing the P2P transaction and confirm the requested initiation of the P2P transaction in accordance with the parameter values. Client device 102 may, in some instances, packaged the received input into a request to initiate the P2P transaction, transmit the request across network 120 to transaction system 130, which may perform operations that initiate the requested P2P transaction, either alone or conjunction with one or more of third-party computing systems 160, and transfer the $50.00 in funds from the checking account of user 101 to the target account associated with the resident identifier.

As described above, however, the limited dimensions of display units incorporated within many mobile communications devices (e.g., smart phones and smart watches) and the limited functionality of display units incorporated within many wearable computing devices (e.g., wearable form factors, etc.), may limit user 101's ability to navigate reliably and accurately through these successively displayed screens or windows, and may reduce an accuracy of the input data provided by user 101. In some instances, the reduction in accuracy may correspond to an increase in an incidence of errors within the specified parameter values, and may require the provision of additional input data by user 101 that corrects and clarifies the erroneous parameter values, all of which collectively reduce a speed at which the executed mobile payment application initiates, clears, and settles the requested P2P transaction in accordance with the specified parameter values.

In some embodiments, described below in reference to FIG. 5A, client device 102 may obtain data that identifies an expected occurrence of a future payment transaction, as an expected P2P transaction transferring funds from user 101's checking account to the target account associated with the resident. The expected P2P transaction can be identified by transaction system 130 based on patterns identified by transaction system 130, or additionally or alternatively, by client device 102 based on locally accessible data specifying prior initiated P2P transactions involving user 101 or client device 102.

Based on the obtained data, client device 102 may determine whether a current value of one or more device parameters is consistent with values of parameters that characterize the expected occurrence of the P2P transaction (e.g., an expected transaction date or time, a range of expected transaction dates or time, an expected transaction location, etc.). In response to the established consistency, client device 102 may perform any of the exemplary processes described herein to modify one or more visual characteristics of first interface element 242, and display, within modified GUI 348, a modified first interface element and a second interface element representative of the expected occurrence of the P2P transaction (e.g., the expected P2P transaction). Further, and upon receipt of input selecting the second interface element, client device 102 may perform operations that initiate the P2P transaction in accordance with the expected values of the transaction parameters and without the display of, and navigation through, successive interface screens or windows.

Referring to FIG. 5A, analysis module 310 of transaction system 130 may access stored customer data 132, and extract customer identifier 304 assigned to user 101. Analysis module 310 may also access stored transaction data 136, and based on customer identifier 304, parse the accessed data to identify one or more initiated transactions involving user 101 and additionally or alternatively, client device 102 (e.g., as initiated by the executed mobile payment application using any of the processes described herein). By way of example, the identified transactions may include, but are not limited to, peer-to-peer (P2P) transactions involving user 101 and additionally or alternatively, initiated based on input provided to client device 102, deposits or withdrawals of funds from a physical branch of the financial institution, purchase transactions involving a financial instrument held by user 101 (e.g., as included within a digital wallet established and maintained by one or more application programs executed by client device 102, such as the mobile payment application), bill-payment transactions initiated, settled and cleared using any of the exemplary processes described herein, and any additional or alternate transaction or exchange of data involving user 101 or initiated based on operations performed by client device 102.

In one aspect, analysis module 310 may extract user transaction data 502 that characterizes each of the identified transactions involving user 101 or initiated by client device 102, as described above. For example, and for each identified transaction, user transaction data 502 may include, but is not limited to, a transaction date or time (e.g., a date or time of initiation of the corresponding transaction at a POS terminal or client device 102), a transaction amount, data characterizing a transaction type (e.g., a P2P transaction, deposit or withdrawal, purchase transaction, etc.), a source account held by user 101 that funds the corresponding transaction, an identifier of a payee or transaction partner, or a target account designated by the payee or transaction partner to receive funds consistent with the transaction amount.

Analysis module 310 may, in some instances, process portions of user transaction data 502 to identify patterns in certain parameter values that characterize the identified prior transactions involving user 101 or client device 102, and based on the identified patterns, predict an expected, future occurrence of a transaction characterized by expected parameter values that are consistent with these prior transactions. For example, analysis module 310 may detect, based on the analysis of user transaction data 502, that user 101 initiates a weekly P2P transaction, e.g., each Friday after 12:00 p.m., that transfers $50.00 in funds from user 101's checking account (e.g., a source account) to a target account associated with the identifier of the resident (e.g., associated with the resident's email address).

In response to this detected pattern within user transaction data 502, analysis module 310 may establish an expected, weekly occurrence of a P2P transaction initiated at client device 102 after 12:00 p.m. each Friday, and transferring $50.00 (e.g., an expected payment amount) from user 101's checking account (e.g., a source account expected to fund the expected P2P transaction) to target account designated by the resident to receive the transferred funds (e.g., as associated with an identifier of the resident, such as the resident's email address). The disclosed embodiments are, however, not limited to these examples of parameter-value patterns analysis and detection processes, and in further aspects, analysis module 310 may apply any additional or alternate pattern analysis and detection algorithm to portions of user transaction data 502, including one or more statistical analytical procedures, adaptive-learning techniques, or artificial intelligence processes appropriate to a sample size of data included within user transaction data 502.

In some aspects, analysis module 310 may generate data, e.g., expected occurrence data 504, that identifies the expected occurrence of the P2P transaction. For example, expected occurrence data 504 may include, but is not limited to, data identifying a transaction type characterizing the P2P transaction (e.g., data identifying the P2P transaction), expected values of occurrence parameters that characterize the expected occurrence (e.g., each Friday after 12:00 p.m.), and expected values of transaction parameters that characterize the P2P transaction, such as an expected payment amount (e.g., $50.00) and an identifier of a source account expected to fund the P2P transaction (e.g., an account number of user 101's checking account), and an identifier of a transaction partner (e.g., the resident's email address). The disclosed embodiments are not limited to these examples of expected occurrence data, and in further aspects, expected occurrence data 504 may include any additional or alternate data that characterizes the expected P2P transaction.

Referring back to FIG. 5A, analysis module 310 may provide expected occurrence data 504 as an input to notification module 316, which may package portions of expected occurrence data 314 into an occurrence notification 506, which transaction system 130 may transmit across network 120 to client device 102. In some aspects, and as described above, initiation module 320 of client device 102 may receive occurrence notification 506 from transaction system 130, and may perform operations that identify, and extract from occurrence notification 506, occurrence parameter data 508 identifying expected values of occurrence parameters that characterize the expected occurrence of the P2P transaction. Initiation module 320 may provide occurrence parameter data 508 as an input to occurrence detection module 324.

In some aspects, and in response to the receipt of occurrence parameter data 508, occurrence detection module 324 may perform operations that determine whether values of certain device parameter of client device 102 are consistent with the expected values of the occurrence parameters, as specified within occurrence parameter data 508. For example, occurrence detection module 324 may process occurrence parameter data 508 to identify the expected values of the occurrence parameters, and to generate data 510 that requests values of device parameters corresponding to the occurrence parameters. As described above, occurrence detection module 324 may provide data 510 as an input to a device parameter module 328, which may perform any of the processes described above to determine the requested values of the device parameters, and package the determined values into a response 512 for provision to occurrence detection module 324.

For example, and as described above, the expected values of the occurrence parameters may indicate that transaction system 130 expects user 101 to initiate the P2P transaction each Friday after 12:00 p.m. Based these expected values and on these occurrence parameters, occurrence detection module 324 may generate data 510 that requests the value of the current date and time, and provide data 510 as an input to device parameter module 328. The disclosed embodiments are, however, not limited to occurrence parameters that specify an expected transaction date and time, and in other aspects, occurrence parameter data 508 may identify additional or alternate occurrence parameter values that characterize the expected P2P transaction, such as a range of expected dates or time, or an expected location of client device 102 during initiation of the P2P transaction.

Device parameter module 328 may, in some instances, provide response 512 as input to occurrence detection module 324, which establishes that the current date and time, e.g., Friday, May 12$^{th}$ at 4:45 p.m., is consistent with the expected transaction date and time of the future P2P transaction, e.g., the P2P transaction transferring $50.00 in funds from user 101's checking account to the resident's designated target account in exchange for the resident's pet care services. By way of example, occurrence detection module 324 may determine that the current date and time, e.g., Friday, May 12$^{th}$ at 4:45 p.m., is consistent with the temporal range associated the expected occurrence of the P2P transaction, e.g., Friday, May 12$^{th}$ after 12:00 p.m., and based on the determination, occurrence detection module 324 may establish the consistency between the current values of the device parameters and the values of the occurrence parameters that characterize the expected occurrence of the future P2P transaction.

In other aspects, occurrence detection module 324 may establish the consistency between the current device parameter values and the occurrence parameter values based on a determination that the current date and time fall within a threshold time period of the expected transaction date or time (e.g., within twelve hours prior to the expected transaction date and time). The disclosed embodiments are not limited to these exemplary indicia of consistency, and in further aspects, occurrence detection module 324 may establish the consistency between the current device parameter values and the occurrence parameter values based on any additional or alternate data appropriate to the expected payment transaction (e.g., the expected bill-payment transaction or the expected P2P transaction), such as determination that a current geographic location of user 101 or client device 102 falls within a threshold distance of an expected transaction location (e.g., a particular address, a geographic region, such as a zip code, etc.).

In response to the established consistency, occurrence detection module 324 may generate output data 514 that confirms the established consistency, and provide output data 514 to interface modification module 340, which performs operations that dynamically and selectively modify portions of GUI 214 to include interface elements that, when selected by user 101, initiate a performance of the future P2P transaction in accordance with the expected values of the transaction parameters. For example, and as illustrated in FIG. 5A, interface modification module 340 may receive output data 514 from occurrence detection module 324, and based on the established consistency, interface modification module 340 may obtain, from initiation module 320, invoice and transaction parameter data 516 that includes values of transaction parameters that characterize the expected occurrence of the future P2P transaction.

By way of example, the transaction parameter values may include, but are not limited to, the expected payment amount (e.g., $50.00), the source account expected to fund the P2P transaction (e.g., an account number or bank routing number of user 101's checking account), an identifier of a transaction partner that the executed mobile payment application associates with a target account designed to receive funds consistent with the transaction account (e.g., an email address of the resident), and values of any additional or alternate transaction parameters that facilitate an initiation of the expected P2P transaction by the executed mobile payment application. In certain aspects (not depicted in FIG. 1), interface modification module 340 may perform operations that store a portion of invoice and transaction parameter data 516 within one or more tangible, non-transitory memories, e.g., within local transaction data 118 of data repository 112.

In further response to the confirmed consistency, interface modification module 340 may also access locally stored data that characterizes and specifies previously displayed interface elements associated with the executed mobile payment application, e.g. first interface element data 212. As described above, first interface element data 212 may include a value of one or more display parameters of an interface element previously presented within GUI 214, such as first interface element 242, which represents the P2P payment functionality of the executed mobile payment application.

For example, as described above in reference to FIG. 2B, first interface element 242 may be displayed on GUI 214 a circular icon characterized by diameter 244A, a center disposed at a corresponding position within GUI 214, and circumferential boundary 244B that encloses a corresponding portion of GUI 214. In certain aspects, first interface element data 212 may include information that specifies the shape of first interface element 242 (e.g., the circular icon) and dimensions of first interface element 242, such as a length of diameter 244A (e.g., in pixels or millimeters). First interface element data 212 may include information that specifies a position first interface element 242 within GUI 214, such as data mapping a center of the circular icon to a corresponding position within GUI 214 and/or positions along boundary 244B to corresponding positions within GUI 214. Further, in some instances, first interface element data 212 may also include additional data specifying one or more visual characteristics of first interface element 242 (e.g., a color, etc.) and images or contextual data presented within first interface element 242, along with their relative display positions within first interface element 242. The disclosed embodiments are, however, not limited to these examples of interface element data, and in other aspects, first interface element data 212 may include any additional or alternate data that enables display unit 106 to render and display first interface element 242 within GUI 214.

In an embodiment, interface modification module 340 may modify a value of one or more of the display parameters or the visual characteristics of first interface element 242 in response to the established consistency between the device parameter values and the expected values of the occurrence parameters (e.g., that characterize the expected P2P transaction). Using any of the processes described above, interface modification module 340 may generate modified first interface element data 518 that specifies the modified values of the display parameters or the modified visual characteristics. Further, interface modification module 340 may also perform any of the exemplary processes described above to determine values of display parameters and visual characteristics of a second interface element representative of the expected P2P transaction, which transfers the $50.00 in funds from user 101's checking account to a target account associated with the identifier of the resident, and generate second interface element data 520 that specifies the determined values of the display parameters and visual characteristics.

In some aspects, interface modification module 340 may provide modified first interface element data 518 and second interface element data 520 as inputs to display unit 106. In some aspects, display unit 106 may display the modified first interface element and the second interface element on GUI 214 in accordance with corresponding ones of the determined display parameters and visual characteristics (e.g., as specified in modified first interface element data 518 and second interface element data 520), which may collectively establish a modified GUI 522. By way of example, the modified first interface element may correspond to an icon representative of the P2P functionality of the executed mobile payment application, and the second interface element may correspond to an icon representative of the expected occurrence of the P2P transaction that, once initiated, cleared, and settled, transfers the $50.00 in funds from user 101's checking account to the target account associated with the identifier of the resident.

As described below, user 101 may establish contact between a portion of a finger (or alternatively, a portion of stylus) and a portion of modified GUI 522 associated with the second interface element, which represents the expected occurrence of the P2P transaction. Client device 102 may detect the established contact, e.g., via input unit 108, and may determine that the established contact corresponds to a selection of second interface element. In response to the determination, the executed mobile payment application may cause client device 102 to perform operations that initiate the P2P transaction in accordance with the expected values of the transaction parameters (e.g., the payment amount of $50.00, the source account corresponding to user 101's checking account, and the target account associated with the resident's email address, as described above). In certain aspects, and by initiating the expected P2P transaction in response to a single input provided to client device 102, and not based on input provided in response to multiple interface elements disposed across successively displayed interface screens or windows, certain of the disclosed embodiments may enhance an ability of user 101 to interact with graphical user interfaces presented by limited-size display units (e.g., those incorporated within smart phones, smart watches, etc.) or limited-functionality display units (e.g., those incorporated within wearable computing devices and other form factors, etc.).

Referring to FIG. 5B, and based on portions of modified first interface element data 518 and second interface element data 520, display unit 106 may display a second interface element 542 at a position within modified GUI 522 that is consistent with the display position of first interface element 222 within GUI 214 (e.g., as depicted in FIG. 2B). Second interface element 542 may, in some instances, be characterized by a circular shape having dimensions consistent with first interface element 222, and may be associated with a circumferential boundary that corresponds to boundary 224B of first interface element 222.

Further, and in additional aspects, display unit 106 may also display a modified first interface element 544 at a corresponding display position within modified GUI 522 such that a circumferential boundary 544A of modified first interface element 544 intersects boundary 224B at corresponding intersection points 546A and 546B, which establishes an arc portion 548 of boundary 544A, and which defines a region 550 of modified GUI 522 that is disposed within and bounded by arc portion 548 and boundary 224B. Additionally, in some instances, display unit 106 may also display, on second interface element 542, contextual information 552 that identifies the transaction partner associated with the expected P2P transaction (e.g., a name or the identifier of the resident) and an expected transaction amount associated with the expected P2P transaction (e.g., $50.00).

As depicted in FIG. 5B, a shape of modified first interface element 544 may be consistent with the circular shape of first interface element 222 within GUI 214, while a diameter of modified first interface element 544 may correspond to a predetermined fraction of diameter 224A (e.g., as specified by user 101 or as specified by transaction system 130 during the provision of data supporting the mobile payment application) or alternatively, by a variable fraction adaptively determined by client device 102 based on, among other things, a size, resolution, or functionality of display unit 106 and/or a presence of additional displayed elements within modified GUI 522. For example, the predetermined or adaptively determined fraction may correspond to 15% of diameter 224A, 25% of diameter 224A, 50% of diameter 224A, or any additional or alternatively fraction appropriate to display unit 106.

In some aspects, and as described above, user 101 may establish contact between a portion of a finger (or alternatively, a portion of stylus) and a portion of region 550, and client device 102 may detect the established contact, e.g., via input unit 108, determine that the established contact corresponds to a selection of second interface element 542. In response to the determination, the executed mobile payment application may cause client device 102 to perform processes that initiate the expected P2P transaction in accordance with the expected values of the transaction parameters, as described below in reference to FIG. 6.

Figure 6:
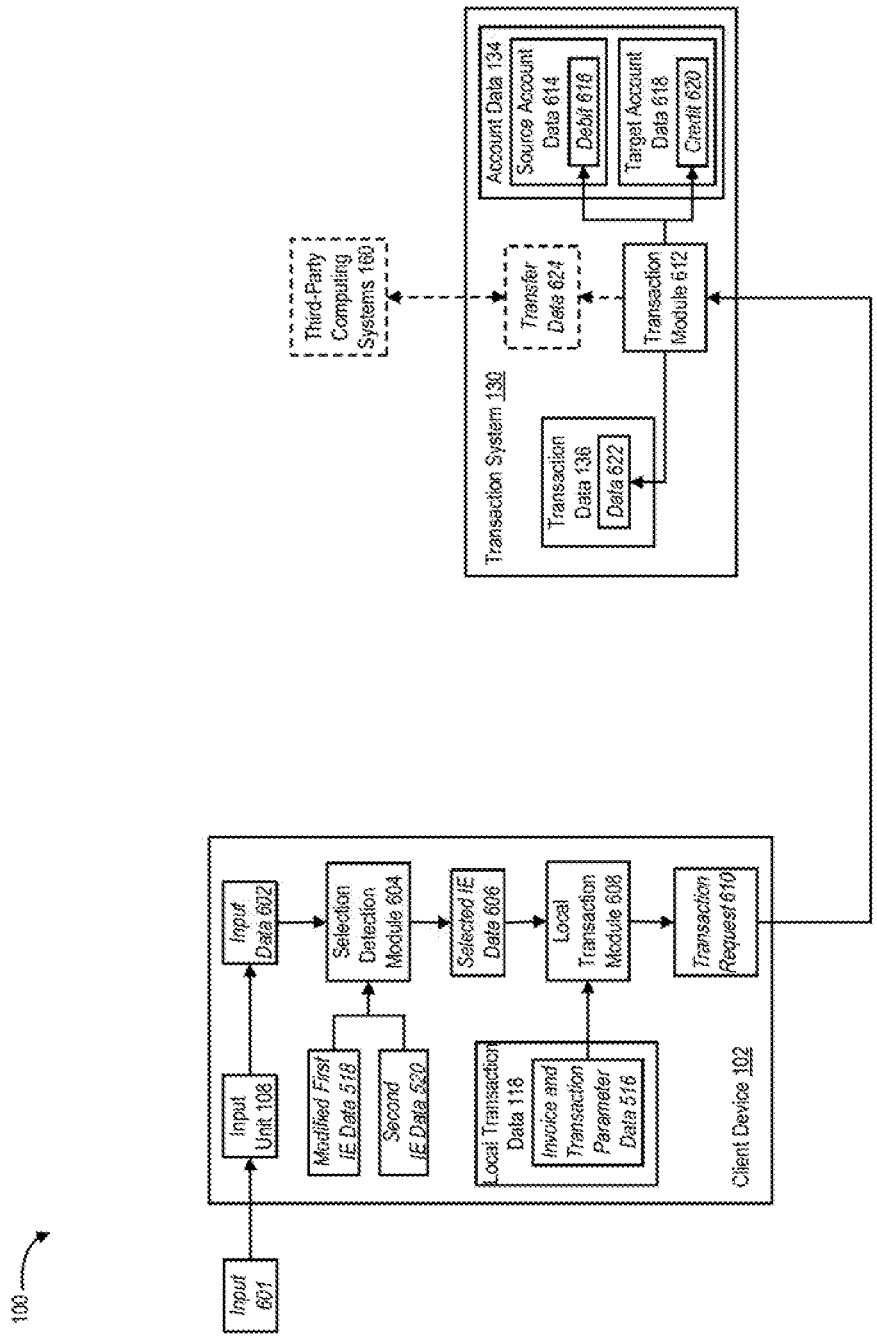
FIG. 6 is an additional diagram illustrating portions of an exemplary computing environment, consistent with the disclosed embodiments.

Referring to FIG. 6, client device 102 may receive, through input unit 108, input 601 from user 101 that selects a second interface element representative of an expected occurrence of a payment transaction, such as the expected occurrences of the bill-payment transaction or the P2P transactions described above. For example, input 601 may indicate selection by user 101 of second interface element 542, which represents the expected P2P transaction transferring $50.00 in funds from user 101's checking account to the resident's designated target account in exchange for the resident's pet care services (e.g., as described above in reference to FIG. 5B). In other aspects, and consistent with the disclosed embodiments, input 601 may also indicate the selection by user 101 of other interface elements displayed on modified GUIs 348 or 522, such as second interface element 404 of FIG. 4A, which represents the expected bill-payment transaction that funds the outstanding Rogers™ Communications invoice, or third interface element 446 of FIG. 4F, which represents the expected bill-payment transactions that funds the outstanding Toronto Hydro™ invoice.

Input unit 108 may receive input 601 and in some aspects, may provide corresponding input data 602 as input to a selection detection module 604. For example, and as described above in reference to FIG. 5B, user 101 may select second interface element 542 by establishing contact between a portion of a finger (or alternatively, a portion of stylus) and a portion of region 550, and input data 602 may specify a position within modified GUI 522 (e.g., and along a surface of display unit 106) that corresponds to the established contact. In some aspects, selection detection module 604 may receive input data 602, and may access data specifying a disposition and orientation of interface elements within modified GUI 522, such as modified first interface element data 518 and second interface element data 520, which map boundaries of modified first interface element 544 and second interface element 542 to corresponding positions within GUI 214.

In some aspects, selection detection module 604 may determine that the position of the established contact within modified GUI 522 corresponds to a region of modified GUI 522 associated with second interface element 542 (e.g., that the position is disposed within region 550 of FIG. 5B), and in response to the determination, selection detection module 604 may establish that input 601 corresponds to a selection of second interface element 542 by user 101. Selection detection module 604 may generate data 606 that identifies the selected interface element (e.g., second interface element 542 of FIG. 5B), and may provide data 606 to as an input to a local transaction module 608, which may perform operations that initiate the expected P2P transaction transferring $50.00 in funds from user 101's checking account to the resident's designated target account in exchange for the resident's pet care services and in accordance with the expected transaction parameters, as described below.

In some aspects, local transaction module 608 may perform operations that identify the selected interface element identified within data 606 (e.g., second interface element 542), and obtain data (e.g., within one or more tangible, non-transitory memories of client device 102) that identifies transaction parameters associated with the expected payment transaction represented by the selected interface element. For instance, local transaction module 608 may access local transaction data 118, and may obtain a portion of invoice and transaction parameter data 516 that includes values of transaction parameters that characterize the expected occurrence of the expected P2P transaction represented by selected second interface element 542. As outlined above, the transaction parameter values for the expected P2P transaction may include, but are not limited to, the expected payment amount (e.g., $50.00), the source account expected to fund the P2P transaction (e.g., an account number or bank routing number of user 101's checking account), and an identifier of the resident (e.g., the resident's email address) that the executed mobile payment application associates with the target account designed to receive the transferred funds.

Local transaction module 608 may package portions data identifying the expected P2P transaction, along with the obtained values of the transaction parameters that characterize the expected P2P transaction, into transaction request 610, which client device 102 may transmit across network 120 to transaction system 130 using any of the communications protocols described herein. In some aspects, not depicted in FIG. 6, local transaction module 608 may also include data that uniquely identifies client device 102 or the executed mobile application within transaction request 610, such as, but not limited to, a payment application cryptogram generated the executed mobile payment application.

In some aspects, a transaction module 612 of transaction system 130 may receive transaction request 610, and in some aspects, may perform operations that verify an identity of user 101 or client device 102, and confirm an authenticity of transaction request 610, based on the identifying data incorporated within transaction request 610 (e.g., the payment application cryptogram). Further, and in response to a successful outcome of these verification and confirmation processes, transaction module 612 may process transaction request 610 to extract data specifying the values of the transaction parameters that characterize the expected P2P transaction, and may perform operations that initiate a performance of the expected P2P transaction in accordance with the extracted transaction parameter values.

For example, the extracted transaction parameter values may identify a source account that funds the expected P2P transaction, e.g., an account number identifying user 101's checking account, and transaction initiation module 612 may access locally stored data associated with user 101's checking account, e.g., source account data 614 within account data 144. In some aspects, as the financial institution that operates transaction system 130 also issued user 101's checking account, transaction initiation module 612 may perform operations that debit the expected transaction amount of $50.00 from user 101's checking account, and store data 616 indicative of the debited funds within a portion of source account data 614, which may reduce an available balance of user 101's checking account by the debited $50.00.

Further, the extracted parameter values may also specify an identifier of the transaction partner designated by user 101 to receive the funds transferred by the expected P2P transaction, e.g., the email address of the resident that provides the pet care services. In one aspect, transaction module 612 may access customer data 132 and based on the specified resident email address, confirm that the resident is a customer of the financial institution and opted-in to participate in mobile-payment and P2P-transaction services provided by the financial institution. For example, when registering for the mobile-payment and P2P-transaction services, the resident may specify a target financial services account (e.g., the resident's checking account) to receive funds transferred in P2P transactions, and transaction initiation module 612 may perform operations that extract, from accessed customer data 132, an identifier of the target financial services account, such as an account number of the resident's checking account, as issued by the financial institution.

In certain aspects, transaction initiation module 612 may access locally stored data associated with the resident's checking account, e.g., target account data 618 within account data 144, and may perform operations that credit the expected transaction amount of $50.00 to the resident's checking account. For example, and as described above, transaction initiation module 612 may store data 620 that identifies the credited funds within a portion of target account data 618, which may increase an available balance of user 101's checking account by the credited $50.00. Further, and upon completion of the transfer between the source and target accounts, transaction initiation module 612 may perform operations that generate and store, within transaction data 136, P2P transaction data 622 that identifies the initiated and executed P2P transaction (e.g., that transferred $50.00 from user 101's checking account to the resident's checking account), and values of transaction parameters that characterize the P2P transaction (e.g., the transaction amount of $50.00, the May $12^{th}$ transaction date, the transaction time of 4:45 p.m., and the account numbers of the source and target accounts). Transaction initiation module 612 may also generate notifications of the initiated and executed transaction, which transaction system 130 may transmit to client device 102 and a device associated with the resident, e.g., via an email transmitted to the resident's email account (not depicted in FIG. 6).

The disclosed embodiments are, however, not limited to processes that initiate P2P transactions and corresponding transfers of funds between source and target accounts issued by a common financial institution, such as the financial institution that operates transaction system 130. For example, the target account involved in the with the expected P2P transaction may be issued by an additional financial institution, which may be associated with one or third-party computing systems 160. In some aspects, and based the accessed portions of customer data 132, transaction initiation module 612 may identify an account number of the resident's checking account and a bank routing number of the additional financial institution. Based on the identified bank-routing number of the financial institution that issues the resident's checking account, transaction initiation module 612 may determine a network address of the corresponding one of third-party computing systems 160 associated with the issuing financial institution.

In certain aspects, transaction module 612 may generate transfer data 624 that includes information identifying the target account of the now-initiated P2P transaction (e.g., the resident's checking account number) and the requested credit to that target account (e.g., $50.00), and transaction system 130 may transmit transfer data 624 across network 120 to determined network address of the corresponding one of the third-party systems 160. The corresponding one of third-party computing systems 160 may perform operations that credit the resident's checking account with the $50.00 transfer, which increases the balance available to the resident's checking account, and may transmit a confirmation of the transferred funds back to transaction system 130 across network 120 (not depicted in FIG. 6). Further, and in response the received confirmation, transaction system 130 may perform any of the processes described above to generate and store, within transaction data 136, data that identifies the initiated and executed P2P transaction (e.g., transaction data 622, as described above), and to generate notifications of the initiated and executed transaction, which transaction system 130 may transmit to client device 102 and the device associated with the resident.

Further, although described in reference to the selection of a second interface element representative of an expected P2P transaction (e.g., second interface element 542 of FIG. 5B), these exemplary transaction initiation processes described above are not limited to P2P transactions represented by corresponding selected interface elements. In other aspects, and consistent with the disclosed embodiments, client device 102 and transaction system 130 (and additionally or alternatively, third-party systems 160) may perform operations that initiate, and subsequently execute, an expected bill-payment transaction represented by a corresponding selected interface element, e.g., second interface element 404 of FIG. 4A or third interface element 446 of FIG. 4F, or any additional or alternate payment transaction consistent with a functionality of the mobile payment application and represented by interface elements presented within modified GUIs 348 and 522.

Further, in certain embodiments described above, and upon execution of the mobile payment application, client device 102 may perform operations that modify a presented graphical user interface (e.g., GUI 214) to include an interface element representative of an expected payment transaction in response to an established consistency between current values of device parameters and values of occurrence parameters that characterize the expected payment transaction. For example, and as described above in reference to FIGS. 3 and 4A, client device 102 may perform operations that display, on GUI 214, second interface element 404, which represents an expected occurrence of a bill-payment transaction that funds an outstanding Rogers™ Communications invoice due May 15$^{th}$, in response to an established consistency between the current date of May 12$^{th}$ and a range of expected transaction dates, e.g., May 11$^{th}$ through May 14$^{th}$.

In other embodiments, however, the current values of the device parameters may be inconsistent with the values of occurrence parameters that characterize the expected payment transaction. For example, and as described above, client device 102 may obtain information establishing an expectation that user 101 will initiate a bill-payment transaction for the outstanding Rogers™ Communications invoice (e.g., which is due on May 15$^{th}$) during a range of transaction dates between May 11$^{th}$ and May 14$^{th}$. In one instance, occurrence detection module 324 of client device 102 may establish that the current date, e.g., May 10$^{th}$, falls outside of the range of expected transaction dates (e.g., May 11$^{th}$ through May 14$^{th}$), and as such, may establish that the current values of the devices parameters are inconsistent with the values of the occurrence parameters that characterize the expected occurrence of the bill-payment transaction.

Figure 7:
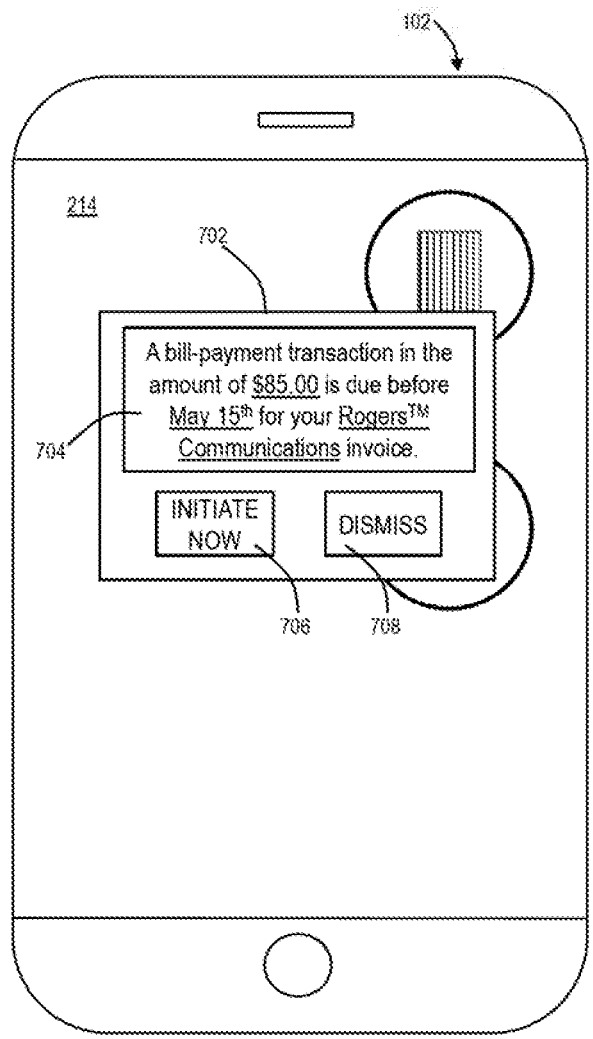
FIG. 7 is an additional diagram of an exemplary graphical user interface, consistent with the disclosed embodiments.

In response to the established inconsistency between these parameter values, interface modification module 340 may generate additional interface elements that, when displayed on GUI 214 by display unit 106, provide a graphical, textual, audible, or tactile notification of the outstanding Rogers™ Communications invoice and of values of certain transaction parameters that characterize the outstanding Rogers™ Communications invoice (e.g., the outstanding balance of $85.00, the due date of May 15$^{th}$, etc.). For example, as illustrated in FIG. 7, client device 102 may perform any of the exemplary processes described herein to generate and display, on GUI 214 via display unit 106, a pop-up notification 702 that includes contextual data 704 identifying the outstanding Rogers™ Communications invoice and the May 15$^{th}$ due date. In some aspects, notification 702 may also prompt user 101 to provide input to client device 102, via input unit 108, that specifies user 101's intention to initiate a bill-payment transaction that funds the Rogers™ Communications invoice, or to dismiss notification 702 and delay the initiation of the bill-payment transaction.

For example, as illustrated in FIG. 7, notification 702 may include an interface element 706 that, when selected by user 101, causes client device 102 to initiate the expected bill-payment transaction and fund the outstanding Rogers™ Communications invoice. In some aspects, user 101 may establish contact between a portion of a finger (or alternatively, a portion of stylus) and a portion of GUI 214 that corresponds to interface element 706, and in response corresponding input data generated by input unit 108, client device 102 may perform any of the exemplary processes described herein to initiate and execute the bill-payment transaction that funds the outstanding Rogers™ Communications invoice in accordance with the expected values of the transaction parameters, e.g., the expected transaction amount of $85.00, the source account corresponding to user 101's checking account, the target account corresponding to a payee account designated by Rogers™ Communications to receive payment, etc.

In other instances, as further illustrated in FIG. 7, notification 702 may also include an interface element 708 that, when selected by user 101, causes client device 102 to dismiss the outstanding notification and delay the initiation of the expected bill-payment transaction. For example, user 101 may establish contact between a portion of a finger (or alternatively, a portion of stylus) and a portion of GUI 214 that corresponds to interface element 708, and in response corresponding input data generated by input unit 108, client device 102 may perform operations that remove notification 702 from display within GUI 214, and establish and associate a temporal delay period with the outstanding Rogers™ Communications invoice (e.g., a temporal period of twelve hours, twenty-four hours, etc.).

Further, upon expiration of the temporal delay period, client device 102 may perform any of the exemplary processes described herein to obtain additional values of the device parameters and establish a consistency between the additional values of the device parameters and the values of the occurrence parameters of the expected bill-payment transaction. In response to the established consistency, client device 102 may perform operations for dynamically and selectively modifying portions of GUI 214 to include interface elements that, when selected by user 101, initiate a performance of the bill-payment transaction funding the outstanding Rogers™ Communications in accordance with the expected values of the transaction parameters (and additionally, or alternatively, the P2P transaction that transfers funds between source and target accounts in exchange for the resident's pet care services).

Figure 8:
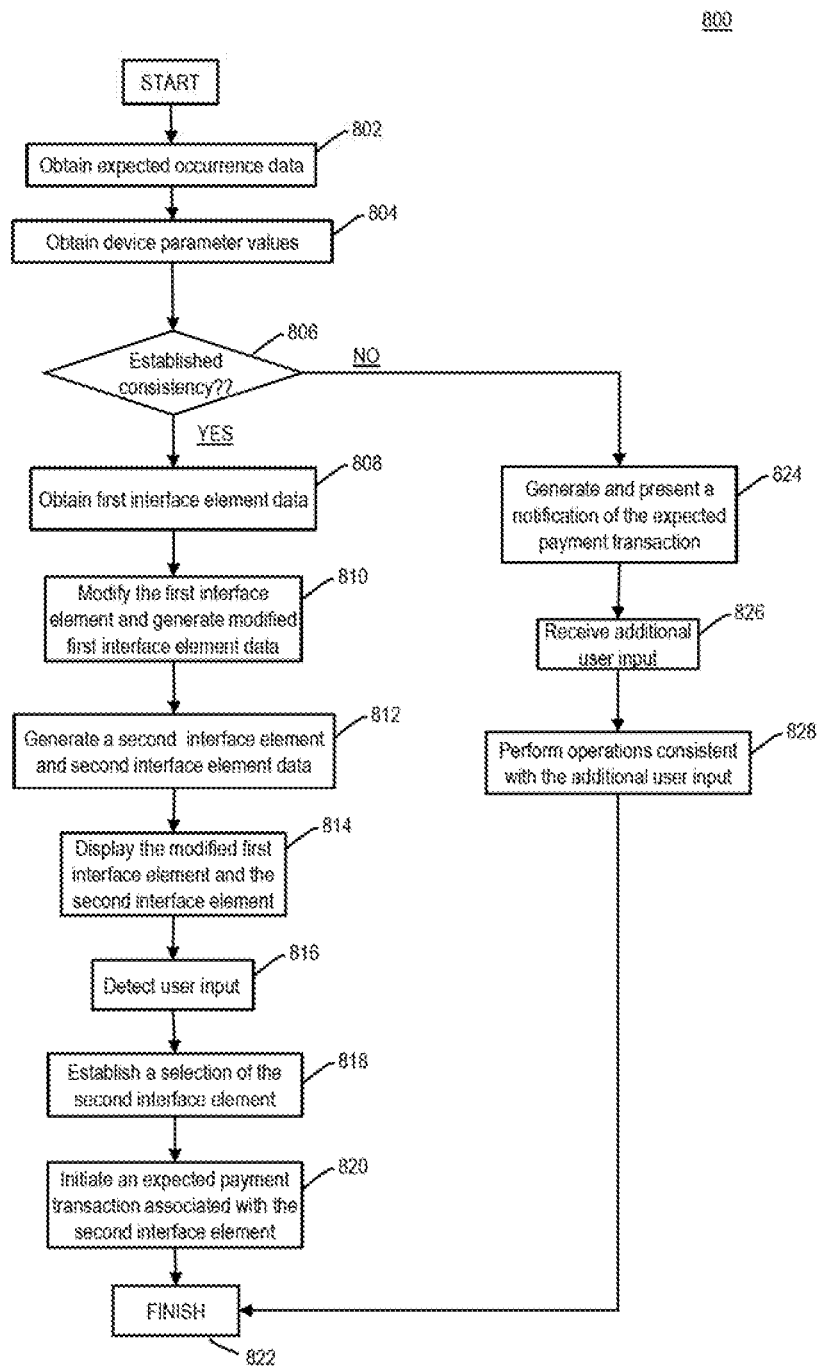
FIG. 8 is a flowchart of an exemplary process for dynamically and selectively modifying portions of a displayed interface, in accordance with disclosed embodiments.

FIG. 8 is a flowchart of an exemplary process 800 for dynamically and selectively modifying portions of a displayed interface to include an interface element that, when selected by a user, initiate a performance of an expected data exchange in accordance with expected values of data exchange-parameters, in accordance with the disclosed embodiments. In certain aspects, and as described above, a client device operated by the user, e.g., client device 102 of FIG. 1, may perform the steps of exemplary process 800. Further, one or more processors of client device 102 (e.g., processor 104 of FIG. 1) may execute a mobile payment application, and in additional aspects, the expected data exchange may correspond to a payment transaction consistent with one or more functionalities of the executed mobile payment application. For example, payment transactions consistent with the disclosed embodiments may include, but are not limited to, bill-payment transactions that fund outstanding invoices, peer-to-peer (P2P) transactions initiated at client device 102 and transferring funds between source and target account, and any additional or alternate transaction consistent with the functionalities of the executed mobile payment application.

Referring to FIG. 8, client device 102 may obtain data that identifies and characterizes an expected occurrence of a payment transaction (e.g., in step 802). For example, the payment transaction may correspond to a bill-payment transaction that funds an outstanding invoice, such as the outstanding Rogers™ Communication invoice described above, and the obtained data may include contextual data characterizing the outstanding invoice (e.g., an identifier of the payee, a due date, and outstanding balance, etc.), values of occurrence parameters that characterize the expected occurrence (e.g., an expected transaction date or time, a range of expected transaction dates or time, etc.), and value of transaction parameters that characterize the expected bill-payment transaction (e.g., an expected transaction amount, a source account that funds the expected bill-payment transaction, and a target account designated by the payee to receive payments).

In other aspects, the payment transaction may correspond to a P2P transaction initiated by client device 102, such as the expected P2P transaction transferring funds between source and target accounts in exchange for pet care services. In some instances, the obtained data may specify, for the expected P2P transaction, contextual data that identifies the expected P2P transaction, values of occurrence parameters that characterize the expected occurrence (e.g., an expected transaction date or time, a range of expected transaction dates or time, an expected transaction location, etc.), and value of transaction parameters that characterize the expected P2P transaction (e.g., an expected transaction amount, a source account that funds the expected P2P transaction, an email address or other identifier of a transaction partner involved in the P2P transaction, etc.). The disclosed embodiments are, however, not limited to the exemplary bill-payment and P2P transaction described above, and in other instances, the obtained data may identify and characterize any additional or alternate payment transaction appropriate to client device 102 and consistent with the functionalities of the executed mobile payment application.

In some aspects, in step 802, client device 102 may receive all or a portion of the data that identifies and characterizes the expected occurrence of the payment transaction from a computing system associated with the executed mobile payment application, e.g., transaction system 130. For example, transaction system 130 may store, within one or more tangible, non-transitory memories, data, e.g., transaction data 136, identifying and characterizing prior initiated and executed payment transactions (e.g., bill-payment transactions or P2P transactions) that involve user 101 or client device 102 (and additionally or alternatively, the payee associated with the outstanding invoice). In certain instances, transaction system 130 may perform any of the exemplary processes described above to identify patterns in certain parameter values within the stored transaction data, and to predict an expected occurrence of the payment transaction that is characterized by expected parameter values that are consistent with the identified patterns.

In other aspects, client device 102 may generate all or a portion of the data that identifies and characterizes the expected occurrence of the payment transaction based on transaction data locally stored within one or more tangible, non-transitory memories, e.g., within local transaction data 118. For example, and as described above, local transaction data 118 may include data identifying and characterizing prior initiated and executed payment transactions (e.g., bill-payment transactions or P2P transactions) initiated by client device 102 during execution of the mobile payment application (and additionally or alternatively, involving the payee associated with the outstanding invoice). In certain instances, client device 102 may perform any of the exemplary processes described above to identify patterns in certain parameter values within the stored transaction data, and to predict an expected occurrence of the payment transaction that is characterized by expected parameter values that are consistent with the identified patterns.

Referring back to FIG. 8, client device 102 may perform any of the exemplary processes described above to obtain data indicative of a current value of one or more device parameters that characterize client device 102 (e.g., in step 804). For example, and as described above, the values of the device parameters may include, but are not limited to, a current date or time, a current geographic location of client device 102, or one or more parameter values characterizing a state of client device 102 (e.g., a battery power level, etc.) or an environment in which client device 102 operates (e.g., a temperature, etc.). Further, and in some instances, client device 102 may a portion of the current values of the device parameters from an integrated sensor or sensing device (e.g., an on-board GPS unit) and additionally or alternatively, from one or more external sensor, sensing devices, or other devices in communication with client device 102 across network 120 or other short-range communications networks (e.g., a network based on NFC protocols).

In some aspects, and using any of the exemplary processes described above, client device 102 may establish a consistency between the current value of the one or more device parameters and the values of the occurrence parameters that characterize the expected occurrence of the payment transaction (e.g., in step 806). For example, the current device parameter values may specify a current date or time, and client device 102 may establish the consistency based on a determination that the current date or time falls within a threshold time period of an expected date or time associated with the expected payment transaction, or alternatively, that the current date or time falls within a range of expected dates or times associated with the expected payment transaction. In other instances, client device 102 may establish the consistency based on a determination that a current geographic position of client device 102 falls within a threshold distance of, or within a predetermined geographic region that includes, an expected transaction location associated with the expected payment transaction.

If client device 102 were to establish the consistency between the current device parameter values and the values of the occurrence parameters that characterize the expected occurrence (e.g., step 806; YES), client device 102 may access locally stored data that characterizes and specifies a previously displayed first interface element that represents a corresponding functionality of the executed mobile payment application (e.g., in step 808). In one aspect, in step 808, client device 102 may perform any of the exemplary processes described above to identify a functionality of the mobile payment application associated with the expected payment transaction (e.g., a bill-payment functionality or a P2P transaction functionality), and to process the accessed data to identify the previously presented first interface element that represents the identified functionality (e.g., first interface element 222, which represents the bill-payment functionality, or first interface element 242, which represents the P2P transaction functionality.

Further, and using any of the exemplary processes described above, client device 102 may modify a value of one or more of a display parameter or a visual characteristic of the previously presented first interface element, and may generate modified first interface element data that specifies and characterizes the modified values of the display parameters or visual characteristics (e.g., in step 810). Client device 102 may also perform any of the exemplary processes described above to determine values of display parameters and visual characteristics of a second interface element representative of the expected payment transaction and the parameter values that characterize the expected payment transaction, and generate second interface element data that specifies the determined values of the display parameters and visual characteristics (e.g., in step 812).

In certain aspects, the modified first interface element data and the second interface element data may establish corresponding ones of a modified first interface element and a second interface element and as described above, may specify a shape, dimension, display position (e.g., information mapping a corresponding boundary to positions on GUI 214), and other visual characteristics, such as color, for each of the modified first interface element and the second interface element. Client device 102 may provide the modified first interface element data and the second interface element data as inputs to a display unit, e.g., display unit 106, which may be configured to display the modified first interface element and the second interface element on a graphical user interface (e.g., GUI 214) in accordance with corresponding ones of the determined display parameters and visual characteristics, as described above (e.g., in step 814).

In some aspects, and as described above, user 101 may establish contact between a portion of a finger (or alternatively, a portion of stylus) and a portion of region 550, and client device 102 may detect the established contact, e.g., via input unit 108 (e.g., in step 816) and determine that the established contact corresponds to a selection of the second interface element (e.g., in step 818). In response to the determination, the executed mobile payment application may cause client device 102 to perform any of the exemplary processes described above that initiate the expected payment transaction in accordance with the expected values of the transaction parameters, either alone or in conjunction with transaction system 130 and/or third-party computing systems 160 (e.g., in step 820). Exemplary process 800 may then be complete in step 822.

Referring back to step 806, if client device 102 were to establish an inconsistency between the current device parameter values and the values of the occurrence parameters that characterize the expected occurrence (e.g., step 806; NO), client device 102 may perform any of the exemplary processes described above to generate, and display on GUI 214, additional interface elements that provide a graphical or textual notification of the expected payment transaction and of values of certain transaction parameters that characterize the expected payment transaction (e.g., in step 824). In some instances, client device 102 may generate interface element data that characterizes and specifies the additional interface elements, and display unit 106 may render the generated interface element data and display the additional interface elements on GUI 216, e.g., as pop-up notification 702 of FIG. 7, which overlays portions of displayed GUI 214. The disclosed embodiments are, however, not limited to graphical or textual notifications, and in other aspects, client device 102 may present, to user 101 in step 824, an audible notification of the expected payment transaction (e.g., pre-determined tone or audio content), a tactile notification of the expected payment transaction, or a combination of one or more textual, graphical, audible, or tactile notifications.

In certain aspects, client device 102 may receive, via input unit 108, additional input from user 101 in response to the displayed additional interface elements (e.g., in step 826), and may perform any of the exemplary processes described above in response to the additional provided input (e.g., in step 828). For example, and as described above, the displayed additional interface elements may prompt user 101 to provide, to client device 102 via input unit 108, first additional input that specifies user 101's intention to initiate an expected transaction that funds the Rogers™ Communications invoice despite the established inconsistency, or alternatively, second additional input that specifies user 101's intention to dismiss notification 702 and delay the initiation of the expected payment transaction.

In one instance, and in response to the detected receipt of the first additional input in step 826, client device 102 may perform any of the exemplary processes described herein to initiate and execute the expected payment transaction (e.g., the expected bill-payment transaction or the expected P2P transaction) in accordance with the expected values of the transaction parameters, e.g., in step 826. In other instances, and in response to the detected receipt of the second additional input in step 826, client device 102 may perform any of the exemplary processes described above to dismiss the outstanding notification and delay the initiation of the expected payment transaction, e.g., in step 828. Exemplary process 800 may then pass back to step 822, and exemplary process 800 is complete.

IV. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including application initiation module 202, interface element generation module 208, identification module 302, analysis module 310, notification module 316, initiation module 320, occurrence detection module 324, device parameter module 328, interface modification module 340, selection determination module 604, local transaction module 608, and transaction module 612, can be implemented as one or more computer programs, i.e., one or more modules of computer program instructions encoded on a tangible non-transitory program carrier for execution by, or to control the operation of, a data processing apparatus (or a computer system). Additionally or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "system," and "device" refer to data processing hardware and encompasses all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A communications device, comprising:
   a display unit;
   an input unit;
   a communications unit;
   a storage unit storing instructions; and
   at least one processor coupled to the display unit, the input unit, the communications unit, and the storage unit, the at least processor being configured to execute the instructions to:
      display, on the display unit, an interface that includes a first interface element representative of a first data exchange involving the communications device, a boundary of the first interface element enclosing a corresponding portion of the interface;
      receive, via the communications unit from a computer system, data indicative of an expected occurrence of a second data exchange involving the communications device, the data comprising expected values of parameters that characterize the second data exchange;
      generate a second interface element representative of the second data exchange;
      when a determined value of a parameter is consistent with the expected parameter values, modify the first interface element and present, on the display unit, the modified first interface element and the second interface element within the portion of the interface enclosed by the boundary of the first interface element;
      receive, from the input unit, a selection of the second interface element displayed on the interface; and
      in response to the received selection of the second interface element, perform operations that initiate the second data exchange in accordance with the expected parameter values.

2. The communications device of claim 1, wherein the at least one processor is further configured to:
   determine the value of the parameter, and compare the determined parameter value with the expected parameter values; and
   establish that the determined parameter value is consistent with the expected parameter values based on an outcome of the comparison.

3. The communications device of claim 1, wherein:
   the expected values of the data exchange parameters comprise an expected date or time for the second data exchange;
   the determined parameter value comprises a current date or time; and
   the at least one processor is further configured to:
      determine that the current date or time falls within a threshold time period of the expected date or time; and
      modify the first interface element and present the modified first interface element and the second interface element on the display unit, when the current date or time falls within the threshold time period of the expected date or time for the second data exchange.

4. The communications device of claim 1, wherein:
   the expected values of the data exchange parameters comprise a range of expected dates or times for the second data exchange; and
   the at least one processor is further configured to:
      determine that a current time or date falls within the range of expected dates or times; and
      modify the first interface element and present the modified first interface element and the second interface element on the display unit, when the current time or date falls within the range of expected dates or times.

5. The communications device of claim 1, wherein:
   the expected values of the data exchange parameters comprise an expected location of the second data exchange;
   the determined parameter value comprises a geographic position of the communications device; and
   the at least one processor is further configured to:
      determine that the geographic position of the communications device is disposed within a threshold distance of the expected location; and modify the first interface element and present the modified first interface element and the second interface element on the display unit, when the geographic position of the communications device falls within the threshold distance of the expected location.

6. The communications device of claim 1, wherein the at least one processor is further configured to:
generate a third interface element when the determined parameter value is inconsistent with the expected values, the third interface element comprising contextual information that identifies the established inconsistency; and
present, on the display unit, the third interface element within a portion of the interface, the contextual information being visible on the display unit.

7. The communications device of claim 1, wherein the at least one processor is further configured to receive the determined parameter value from a sensor.

8. The communications device of claim 1, wherein the computer system is configured to generate the expected parameter values based on an analysis of prior data exchanges involving the communications device.

9. The communications device of claim 1, wherein:
the storage unit stores transaction data characterizing prior data exchanges involving the communications device; and
the at least one processor is further configured to:
load the transaction data from the storage unit;
generate additional expected values of parameters that characterize the second data exchange based on an analysis of the transaction data; and
when the determined parameter value is consistent with the expected parameter values and at least one of the additional expected parameter values, modify the first interface element and present, on the display unit, the modified first interface element and the second interface element within the portion of the interface enclosed by the boundary of the first interface element.

10. The communications device of claim 1, wherein:
the first data exchange comprises a first payment transaction;
the second data exchange comprises a second payment transaction;
the first and second payment transactions comprise a bill-payment transaction that funds an outstanding invoice or a peer-to-peer transaction; and
the expected parameter values comprise: (i) an expected transaction date or time for the second payment transaction; (ii) a range of expected transaction dates or times for the second payment transaction; or (iii) an expected location for the second payment transaction, the expected parameter values being determined based on prior payment transactions involving the communications device.

11. The communications device of claim 10, wherein:
the expected parameter values further comprise expected values of transaction parameters that characterize the second payment transaction, the expected transaction parameters comprising an expected transaction amount, a source financial services account that funds the second payment transaction, or a second financial services account designated to receive funds consistent with the expected transaction amount; and
the at least one processor is further configured to perform operations that, in response to the received input data, initiate the second payment transaction in accordance with the expected values of the transaction parameters.

12. A computer-implemented method, comprising:
displaying, by at least one processor, and on a display unit, an interface that includes a first interface element representative of a first data exchange involving a device, a boundary of the first interface element enclosing a corresponding portion of the interface;
receiving, by the at least one processor, and from a computer system, data indicative of an expected occurrence of a second data exchange involving the device, the data comprising expected values of parameters that characterize the second data exchange;
generating, by the at least one processor, a second interface element representative of the second data exchange;
by the at least one processor, and when a determined value of a parameter is consistent with the expected parameter values, modifying the first interface element and presenting, on the display unit, the modified first interface element and the second interface element within the portion of the interface enclosed by the boundary of the first interface element;
receiving, by the at least one processor, a selection of the second interface element displayed on the interface; and
in response to the received selection of the second interface element, performing, by the at least one processor, operations that initiate the second data exchange in accordance with the expected parameter values.

13. The method of claim 12, wherein:
the expected values of the data exchange parameters comprise an expected date or time for the second data exchange;
the determined parameter value comprises a current date or time; and the method further comprises:
determining that the current date or time falls within a threshold time period of the expected date or time; and
modifying the first interface element and presenting the modified first interface element and the second interface element on the display unit, when the current date or time falls within the threshold time period of the expected date or time.

14. The method of claim 12, wherein:
the expected values of the data exchange parameters comprise a range of expected dates or times for the second data exchange; and
the method further comprises:
determining that the current time or date falls within the range of expected dates or times; and
modifying the first interface element and presenting the modified first interface element and the second interface element on the display unit, when the current time or date falls within the range of expected dates or times.

15. The method of claim 12, wherein:
the expected values of the data exchange parameters comprise an expected location of the second data exchange;
the determined parameter value comprises a geographic position of the device; and
the method further comprises:
determining that the geographic position of the device is disposed within a threshold distance of the expected location; and modifying the first interface element and presenting the modified first interface element and the second interface element on the display unit, when the geographic position of the device falls within the threshold distance of the expected location.

16. The method of claim 12, further comprising:

generating a third interface element when the determined parameter value is inconsistent with the expected values, the third interface element comprising contextual information that identifies the established inconsistency; and presenting, on the display unit, the third interface element within a portion of the interface, the contextual information being visible on the display unit.

17. The method of claim 12, wherein the computer system is configured to generate the expected parameter values based on an analysis of prior data exchanges involving the device.

18. The method of claim 12, further comprising:

obtaining transaction data characterizing prior data exchanges involving the device or a use of the device;

generating additional expected values of parameters that characterize the second data exchange based on an analysis of the stored transaction data; and when the determined parameter value is consistent with the expected parameter values and at least one of the additional expected parameter values, modifying the first interface element and presenting, on the display unit, the modified first interface element and the second interface element within the portion of the interface enclosed by the boundary of the first interface element.

19. The method of claim 12, wherein:

the first data exchange comprises a first payment transaction;

the second data exchange comprises a second payment transaction;

the first and second payment transactions comprise a bill-payment transaction that funds an outstanding invoice or a peer-to-peer transaction;

the expected parameter values comprise: (i) an expected transaction date or time for the second payment transaction; (ii) a range of expected transaction dates or times for the second payment transaction; or (iii) an expected location for the second payment transaction, the expected parameter values being determined based on prior payment transactions involving the device;

the expected parameter values further comprise expected values of transaction parameters that characterize the second payment transaction, the expected transaction parameters comprising an expected transaction amount, a source financial services account that funs the second payment transaction, or a second financial services account designated to receive funds consistent with the expected transaction amount; and the at least one processor further performs operations that, in response to the received input data, initiate the second payment transaction in accordance with the expected values of the transaction parameters.

20. A tangible, non-transitory computer-readable medium storing instructions that, when executed by at least one processor, perform a method comprising:

displaying, on a display unit, an interface that includes a first interface element representative of a first data exchange involving a device, a boundary of the first interface element enclosing a corresponding portion of the interface;

receiving, from a computer system, data indicative of an expected occurrence of a second data exchange involving the device, the data comprising expected values of parameters that characterize the second data exchange;

generating a second interface element representative of the second data exchange;

when a determined value of a parameter is consistent with the expected parameter values, modifying the first interface element and presenting, on the display unit, the modified first interface element and the second interface element within the portion of the interface enclosed by the boundary of the first interface element;

receiving a selection of the second interface element displayed on the interface; and in response to the received selection of the second interface element, performing operations that initiate the second data exchange in accordance with the expected parameter values.

* * * * *